(12) United States Patent
Pierick et al.

(10) Patent No.: US 8,113,530 B2
(45) Date of Patent: Feb. 14, 2012

(54) NANO-METAL BICYCLE FRAME AND RELATED COMPONENTS

(75) Inventors: David Pierick, San Diego, CA (US); Herbert Reyes, Laguna Niguel, CA (US); William F. Davidson, III, Huntington Beach, CA (US); Dhananjay Bhatt, Laguna Hills, CA (US); Yongkui Wen, Carlsbad, CA (US)

(73) Assignee: PowerMetal Technologies, Inc., Carlsbad, CA (US)

( * ) Notice: Subject to any disclaimer, the term of this patent is extended or adjusted under 35 U.S.C. 154(b) by 407 days.

(21) Appl. No.: 12/201,091

(22) Filed: Aug. 29, 2008

(65) Prior Publication Data

US 2009/0152042 A1 Jun. 18, 2009

Related U.S. Application Data

(60) Provisional application No. 60/968,788, filed on Aug. 29, 2007.

(51) Int. Cl.
*B62K 1/00* (2006.01)
(52) U.S. Cl. .................................. 280/281.1; 280/288.3
(58) Field of Classification Search ............... 280/281.1, 280/288.3
See application file for complete search history.

(56) References Cited

U.S. PATENT DOCUMENTS

| | | | | |
|---|---|---|---|---|
| 7,320,832 | B2 * | 1/2008 | Palumbo et al. | 428/548 |
| 7,354,354 | B2 * | 4/2008 | Palumbo et al. | 473/320 |
| 7,387,578 | B2 * | 6/2008 | Palumbo et al. | 473/320 |
| 2001/0022208 | A1 * | 9/2001 | Perepezko et al. | 148/561 |
| 2006/0135281 | A1 * | 6/2006 | Palumbo et al. | 473/316 |
| 2006/0135282 | A1 * | 6/2006 | Palumbo et al. | 473/316 |
| 2006/0160636 | A1 * | 7/2006 | Palumbo et al. | 473/316 |
| 2008/0089830 | A1 * | 4/2008 | Smalley et al. | 423/461 |
| 2008/0107805 | A1 * | 5/2008 | Palumbo et al. | 427/181 |
| 2008/0119307 | A1 * | 5/2008 | Palumbo et al. | 473/564 |
| 2008/0224100 | A1 * | 9/2008 | Smalley et al. | 252/510 |
| 2008/0254310 | A1 * | 10/2008 | Palumbo et al. | 428/551 |
| 2008/0311025 | A1 * | 12/2008 | Smalley et al. | 423/447.3 |
| 2009/0004094 | A1 * | 1/2009 | Smalley et al. | 423/447.1 |
| 2009/0169463 | A1 * | 7/2009 | Smalley et al. | 423/445 B |
| 2010/0028714 | A1 * | 2/2010 | Palumbo et al. | 428/650 |

OTHER PUBLICATIONS

U.S. Appl. No. 12/043,710, filed Mar. 6, 2008, Pierick et al.

* cited by examiner

*Primary Examiner* — Joanne Silbermann
*Assistant Examiner* — Michael Stabley
(74) *Attorney, Agent, or Firm* — Fay Sharpe LLP

(57) ABSTRACT

A bicycle comprises a frame. A portion of the frame includes a substrate and a layer of nano-crystalline material extending over at least a portion of the substrate. A conductive interface is disposed between the substrate and layer of nano-crystalline material for improved adhesion of the layer of nano-crystalline material to the substrate and improved impact performance of the frame portion.

16 Claims, 15 Drawing Sheets

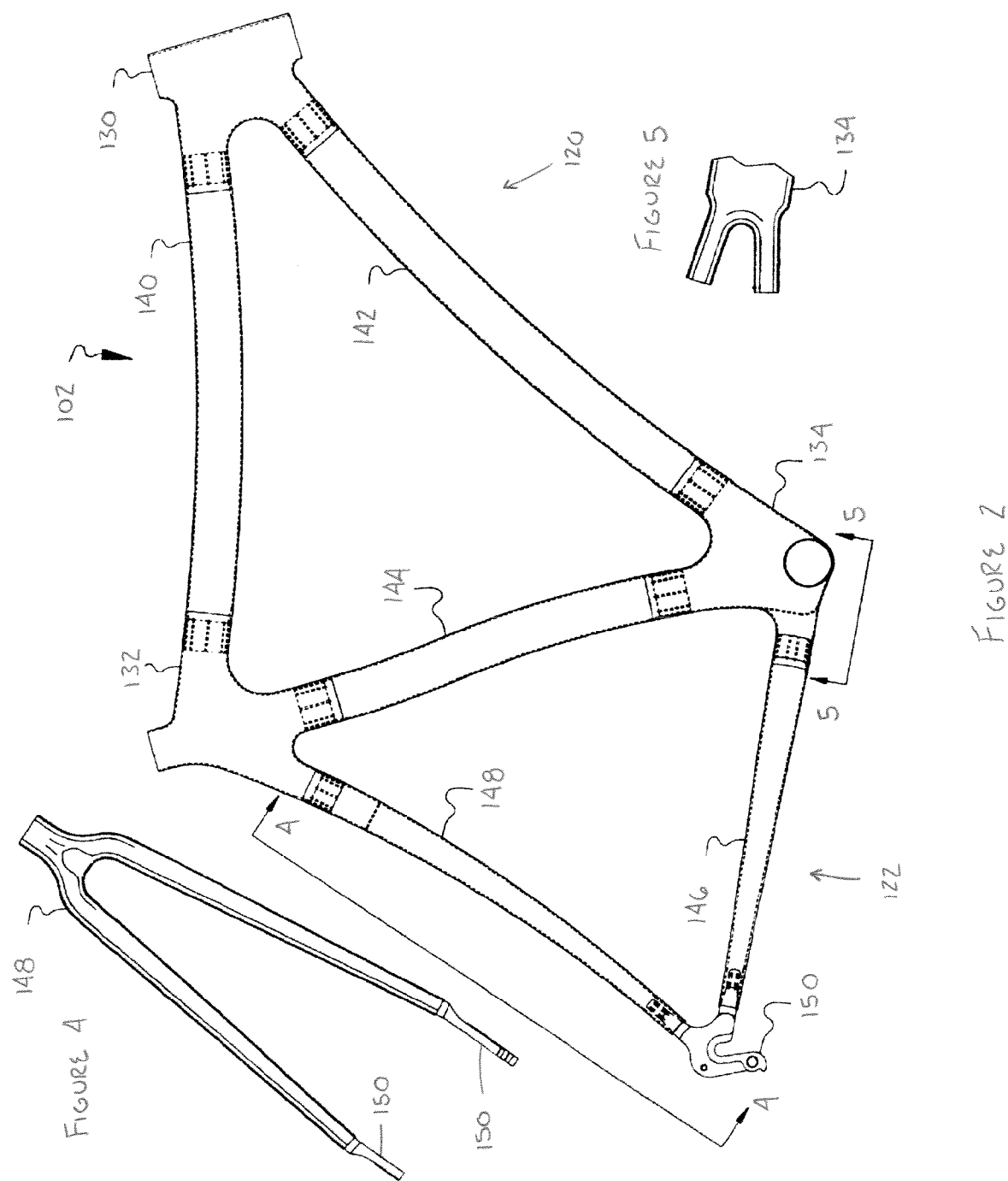

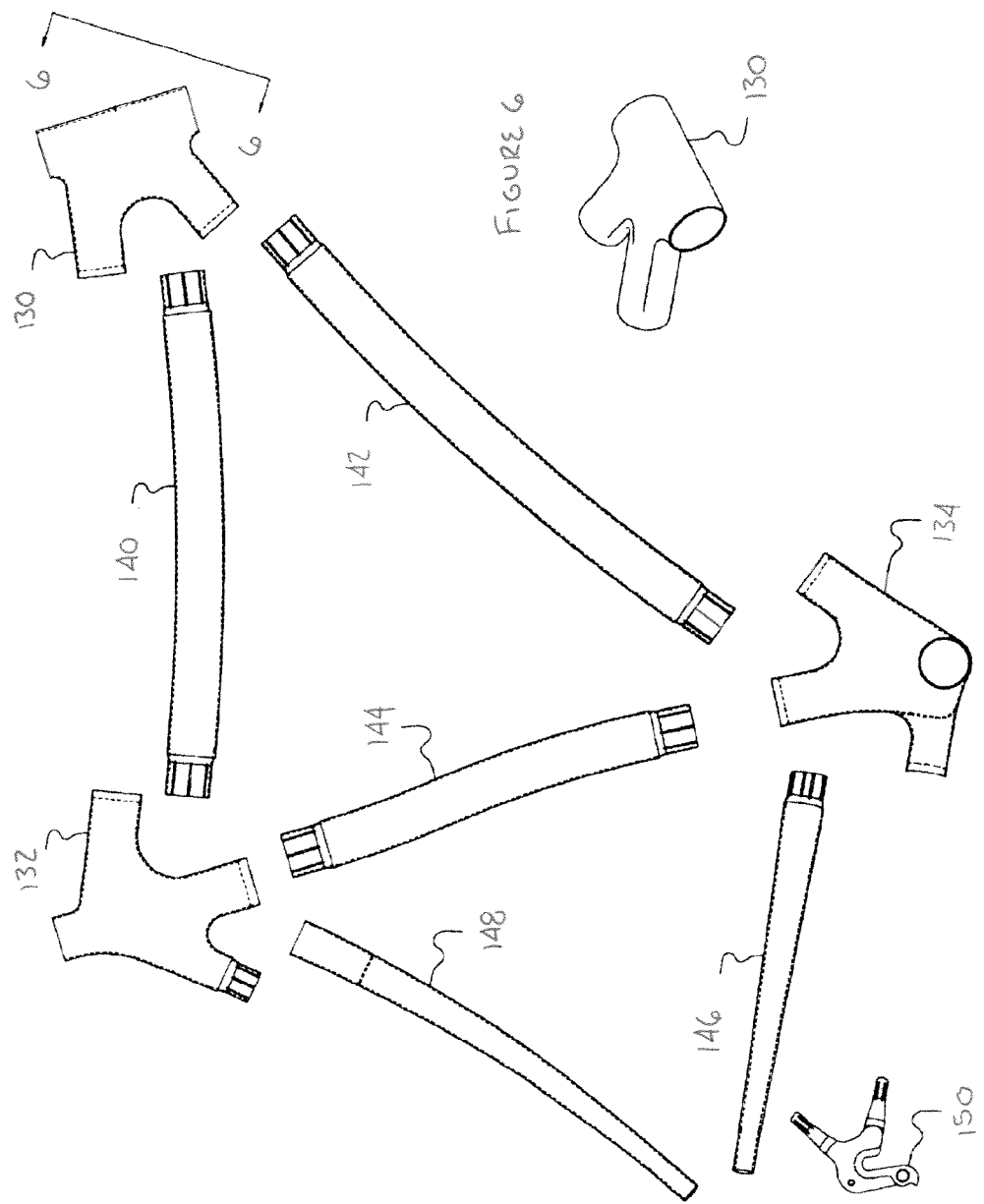

Conductive interface, such as a copper foil or other metallized foil or metallized film, can be activated with a silane, such as an organosilane, for improved adhesion Substrate Conductive interface for adhesion and impact performance A portion of a bicycle frame and component including a substrate and a layer of nano-crystalline material extending over the substrate Nano-crystalline material Substrate Conductive interface, such as a metallized foil or metallized file Silane treated for improved adhesion of conductive interface during co-cure to substrate

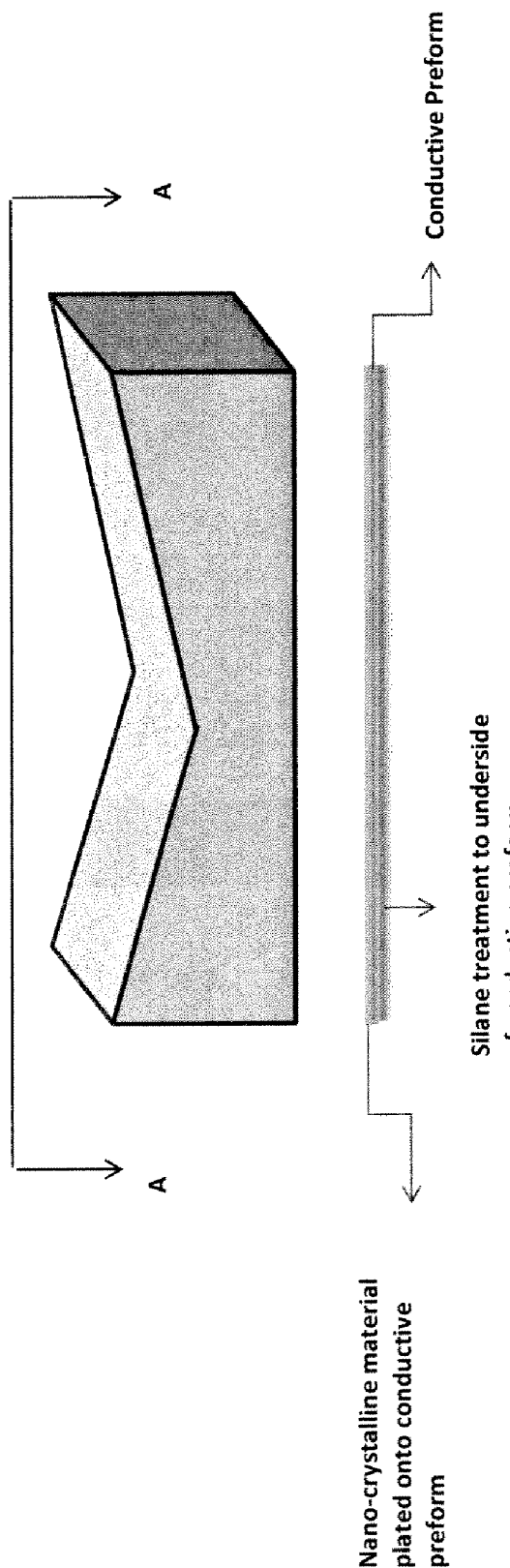

NANO-METAL BICYCLE FRAME AND RELATED COMPONENTS

RELATED APPLICATIONS

This application claims priority from U.S. Provisional Patent Application Ser. No. 60/968,788, filed 29 Aug. 2007, the disclosure of which is incorporated herein by reference.

BACKGROUND

The present invention generally relates to sports equipment such as bicycles and similar human propelled vehicles. More particularly, but not exclusively, this disclosure relates to the design, manufacturing, and construction of bicycle frames and components using nanostructure materials to improve characteristics such as strength, performance, and durability.

Designers and manufacturers of sports equipment often seek ways to improve performance by utilizing new materials and construction methods. As can be appreciated, finding a suitable combination of materials and mechanical design to meet a particular set of performance criteria can be a challenging task.

Bicycles and similar human powered vehicles (denoted collectively herein as "bicycles") have evolved over the past 150 years in conjunction with innovations in mechanical design and configuration as well as underlying materials. Frames, wheels, tubes, brakes, and other components used to make bicycles have improved over time to be lighter, stronger, and more durable, provide better handling and braking, and offer other performance advantages. While current bicycle designs have benefited from a range of these design and materials innovations, there is an ongoing need in the art for improvements to materials and components used in bicycles to decrease weight and improve structure, performance, and durability.

SUMMARY

According to one embodiment of the present disclosure, a bicycle comprises a frame. A portion of the frame includes a substrate and a layer of nano-crystalline material extending over at least a portion of the substrate. A conductive interface is disposed between the substrate and layer of nano-crystalline material for improved adhesion of the layer of nano-crystalline material to the substrate and improved impact performance of the frame portion.

According to another embodiment of the present disclosure, a method of manufacturing a bicycle frame comprises providing a frame portion. The frame portion includes one of a head tube lug, a seat tube lug, a bottom bracket lug, a top tube, a down tube, a seat tube, a chain stay and a seat stay. At least a portion of the frame portion is formed as a substrate. The substrate is coated, at least in part, with a nano-crystalline material.

According to yet another embodiment of the present disclosure, a method of forming a bicycle component comprises providing a bicycle component for mounting to an associated bicycle frame. The bicycle component includes one of a fork, a derailleur, a rim, a spoke, a brake, a sprocket, a pedal, a crank arm, a stem, a cable, a chain and a handle bar. At least a portion of the bicycle component is formed as a substrate. The substrate is coated, at least in part, with a nano-crystalline material.

According to still yet another embodiment of the present disclosure, a method of applying nano-crystalline material onto a substrate comprises providing a three dimensional conductive preform of the substrate. The nano-crystalline material is electro-deposited onto the preform. The electro-deposited preform is treated with an organosilane to improve adhesion of the preform to the substrate.

Other aspects and embodiments of the disclosure are also contemplated. The foregoing summary and the following detailed description are not meant to restrict the disclosure to any particular embodiment, but are merely meant to describe some embodiments of the disclosure.

BRIEF DESCRIPTION OF THE DRAWINGS

For a better understanding of the nature and objects of some embodiments of the invention, reference should be made to the following detailed description taken in conjunction with the accompanying drawings.

FIGS. 2-4 are views of a hollow frame of the bicycle of FIG. 1.

FIG. 5 is an exploded view of the frame of FIG. 2.

FIG. 6 is a view of the head tube lug of the frame in FIG. 5.

FIGS. 20 and 21 illustrate a method of forming an electro-formed component by using a conductive preform of a bicycle component to be plated with nanocrystalline alloy.

FIGS. 22-26 illustrate nano-crystalline bicycle frame and component design and analysis characteristics in accordance with the present disclosure.

DETAILED DESCRIPTION

Definitions

The following definitions apply to some of the features described with respect to some embodiments of the disclosure. These definitions may likewise be expanded upon herein.

As used herein, the term "submicron range" refers to a range of dimensions less than about 1,000 nm, such as from about 2 nm to about 900 nm, from about 2 nm to about 750 nm, from about 2 nm to about 500 nm, from about 2 nm to about 300 nm, from about 2 nm to about 100 nm, from about 10 nm to about 50 nm, or from about 10 nm to about 25 nm.

As used herein, the term "nanometer range" or "nm range" refers to a range of dimensions from about 1 nm to about 100 nm, such as from about 2 nm to about 100 nm, from about 10 nm to about 50 nm, or from about 10 nm to about 25 nm.

As used herein, the term "size" refers to a characteristic dimension of an object. When referring to a set of objects as having a specific size, it is contemplated that the objects can have a distribution of sizes around the specific size. Thus, as used herein, a size of a set of objects can refer to a typical size of a distribution of sizes, such as an average size, a median size, or a peak size.

As used herein, the term "grain size" refers to a size of a set of constituents or components included in a material, such as a nanostructure material. When referring to a material as being "fine-grained," it is contemplated that the material can have an average grain size in the submicron range, such as in the nm range.

As used herein, the term "microstructure" refers to a microscopic configuration of a material. An example of a microstructure is one that is quasi-isotropic in which a set of crystals are relatively uniform in shape and size and exhibit a relatively uniform grain boundary orientation. Another example of a microstructure is one that is anisotropic in which a set of crystals exhibit relatively large deviations in terms of shape, size, grain boundary orientation, texture, or a combination thereof.

Overview

A bicycle having various components fused with nanostructured metals can be designed for a variety of bicycles such as mountain bicycles, road bicycles, touring bicycles, as well as a variety of other types of bicycles. An exemplary conventional bicycle 100 is shown in FIG. 1.

Figure 1:
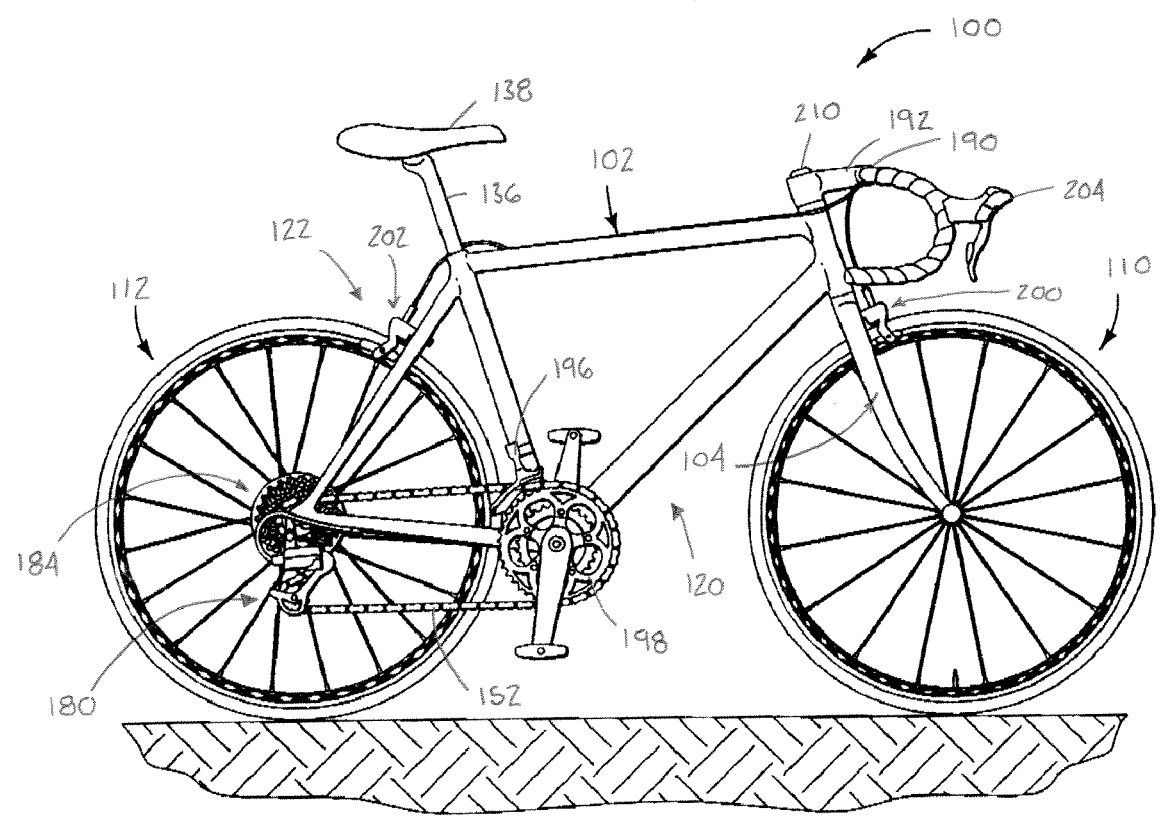
FIG. 1 is a side elevational view of a conventional bicycle.

With reference to FIG. 1, the bicycle generally includes a bicycle frame 102 with a fork 104 pivotally coupled thereto. A front wheel 110 and a rear wheel 112 are coupled to the frame and the fork. The frame 102 is a basic diamond frame, a truss consisting of two triangles, namely, a front triangle part 120 and a rear triangle part 122. As shown in FIGS. 2-6, the bicycle frame is a typical tube and lug hollow bicycle frame. The bicycle frame includes a head tube lug 130 (also shown as a top view in FIG. 6), a seat tube lug 132 and a bottom bracket lug 134 (also shown as a bottom view in FIG. 5). The head tube lug contains a headset, the set of bearings that allows the fork 104 to turn smoothly for steering and balance. The seat tube lug secures a seat post 136 and seat 138 to the frame. A top tube 140, down tube 142 and seat tube 144 at least partially form the front triangle part 120. A pair of chain stays 146 (see FIG. 4) and a pair of seat stays 148, together with the seat tube, at least partially form the rear triangle part 122. The chain stays run parallel to a chain 152. The tubes may be straight or curved, as shown in the Figures. The lugs are interconnected by the front and rear triangle part tubes. Dropouts 150 are joined to the seat tube lug and bottom bracket lug by the seat tubes 148 and the chain tubes 146, respectively.

Figure 7:
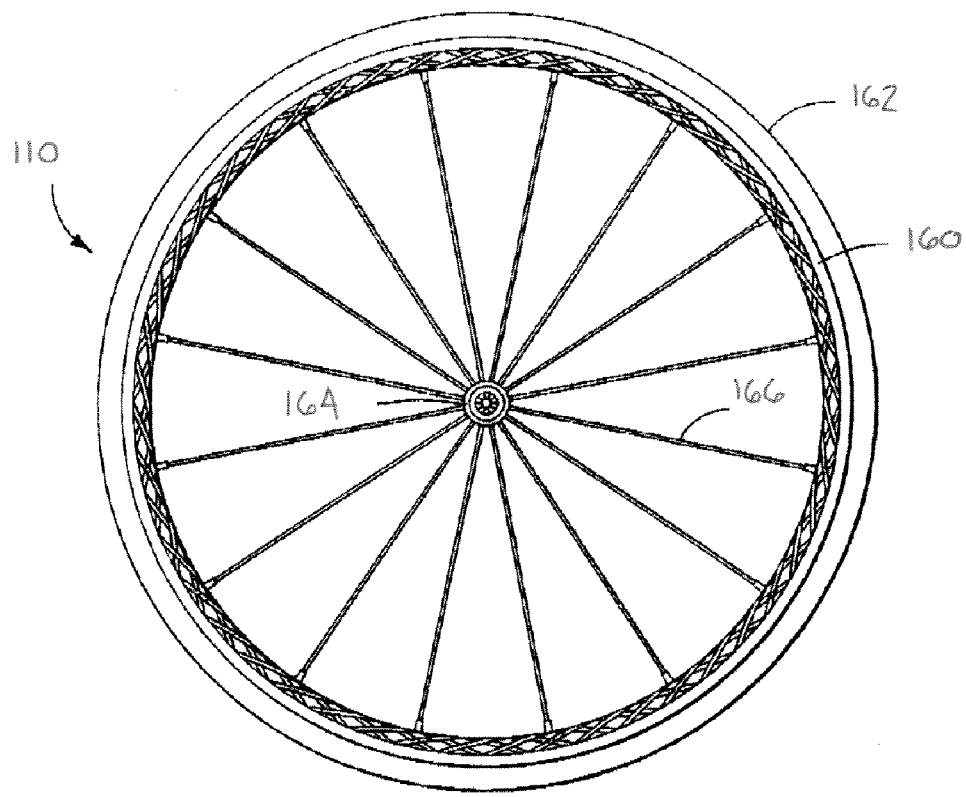
FIG. 7 is a side elevational view of the front wheel of the bicycle of FIG. 1.
Figure 8:
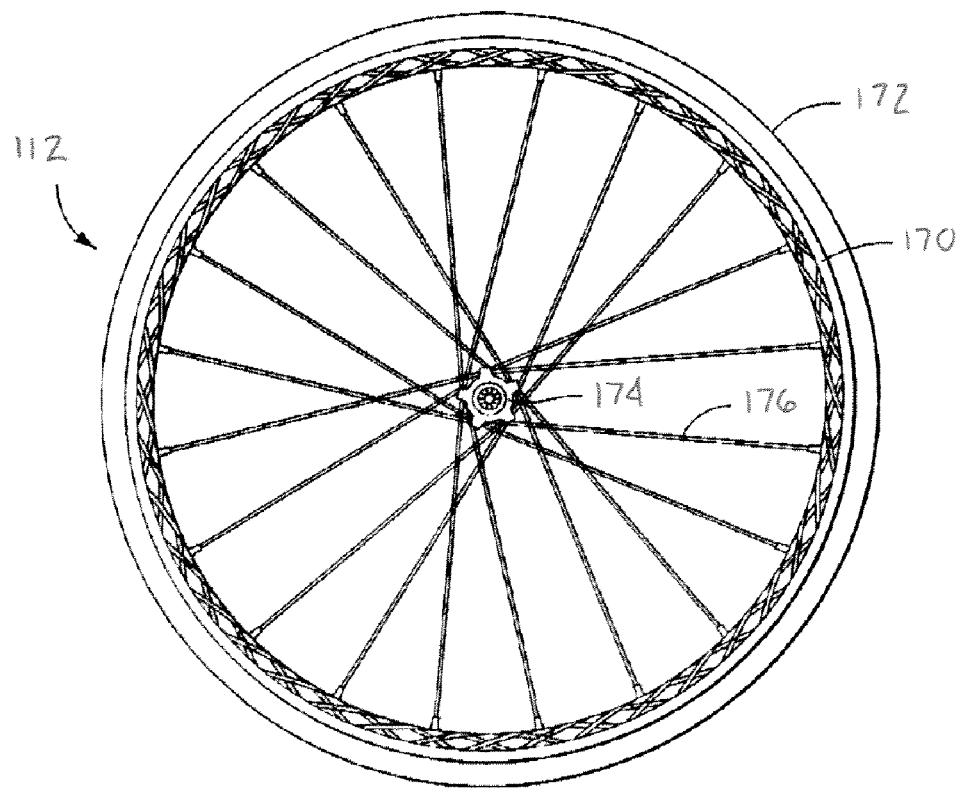
FIG. 8 is a side elevational view of the rear wheel of the bicycle of FIG. 1.

As shown in FIGS. 7 and 8, the front bicycle wheel 110 includes an annular rim 160 with a pneumatic tire 162, a center hub 164, and a plurality of spokes 168 extending between the center hub and the annular rim. The front wheel is coupled to the fork 104 in a conventional manner. Similarly, the rear bicycle wheel 112 includes an annular rim 170 with a pneumatic tire 172, a center hub 174, and a plurality of spokes 176 extending between the center hub and the annular rim. The rear wheel is coupled to the rear triangle part 122 of the frame 102 in a conventional manner. A rear derailleur 180 (see FIG. 1) is mounted directly to the rear hub 174. The rear hub has a plurality of rear sprockets 184 mounted on a free wheel of the rear hub in a conventional manner.

With reference again to FIG. 1, the rear derailleur 180 is operatively coupled to a rear shifter 190 via a rear derailleur control cable (not shown). Similarly, a front shifter (not shown) is coupled to a front derailleur 196 via a front derailleur control cable (not shown). Each control cable has a protective outer sleeve or casing and an inner wire. The rear and front shifters are typically mounted on a handle bar 192 to control the rear and front derailleurs in a relatively conventional manner to move the chain 152 laterally over the rear sprockets 184 and front sprockets 198. Front and rear brake assemblies 200 and 202 respectively, are controlled by hand brakes 204 (only one is illustrated) located on the handle bar. As is well known, the handle bar is mounted to the had tube lug via a stem 210.

The present disclosure relate generally to design and fabrication of the exemplary bicycle frame described above, such as the head tube lug, seat tube lug, bottom bracket lug, top tube, down tube, seat tube, chain stay, and seat stay (herein collectively denoted as "bicycle frame"), and bicycle components described above, such as the fork, derailleur, wheel components (e.g., rim and spokes), brakes, sprockets, pedals, crank arms, stem, cables, chain, handle bar and other components (herein collectively denoted as "bicycle component"). The bicycle frame and component can be formed with a variety of polymer or metallic substrates fused with nanostructured materials having desirable mechanical and vibro-acoustic properties. In particular, the nanostructured materials can exhibit characteristics such as high yield strength, high strength-to-weight ratio, high resilience, high fracture toughness, high elasticity, low or high vibration damping, high hardness, high ductility, high wear resistance, and/or high corrosion resistance. In such a manner, the bicycle frame and component can have improved performance characteristics over equivalent non-coated implementations while being formed in an efficient and cost-effective manner.

In one embodiment, a bicycle frame and component includes a portion having a tie conductive layer co-cured with the substrate in order to improve the adhesion between the nanocrystalline layer and the composite.

In one embodiment, a bicycle frame and component include a portion that includes a nanostructured material. The nanostructured material includes a metal, and the nanostructured material may have an average grain size that is in the range of 2 nm to 5,000 nm, a yield strength that is in the range of 200 Mega Pascal ("MPa") to 2,750 MPa, and a hardness that is in the range of 100 Vickers to 2,000 Vickers.

In another embodiment, a bicycle frame and component includes an electro-deposited or electro-formed fine-grained metal or metal alloy coating that may have a thickness between 10 micrometers ("µm") and 5 millimeters ("mm") and up to 5 centimeters ("cm"). The coating may exhibit resilience of at least 0.25 MPa and up to 25 MPa, and an elastic strain limit of at least 0.75% and up to 5.00%.

In another embodiment, a bicycle frame and component comprises a resin of thermoplastic or thermoset polymer material (substrate) that may incorporate a metallic coating representing at least 0.5%, such as more than 10% or more than 20%, and up to 75%, 85%, or 95% of a total weight on a polymer substrate optionally containing graphite/carbon or other fibers including chopped fiber or other strength-enhancing particulates. A lateral and bending stiffness per unit weight of typical components containing the metallic coating may be improved by at least about 5% when compared to a lateral or bending stiffness of a similar component not containing the metallic coating or encapsulation; or a bending stiffness equivalent to the substrate but with other benefits, such as enhanced impact strength and feel.

In another embodiment, a bicycle frame and component may include a portion that includes a first layer and a second layer adjacent to the first layer. At least one of the first layer and the second layer may include a nanostructured material that has a grain size in the submicron range, such as in the nanometer range. Nanostructured materials can be formed as high-strength coating of pure metals, alloys of metals selected from the group of Ag, Au, Co, Cu, Cr, Fe, Ni, Sn, Fe, Pt and Zn and alloying elements selected from the group of Mo, W, B, C, P, S, and Si, and metal matrix composites of pure metals or alloys with particulate additives, such as powders, fibers, nanotubes, flakes, metal powders, metal alloy powders, and metal oxide powders of Al, Co, Cu, In, Mg, Ni, Si, Sn, V, and Zn; nitrides of Al, B and Si; C (e.g., graphite, diamond, nanotubes, Buckminster Fullerenes); carbides of B, Cr, Bi, Si, Ti, V, Zr, Mo, Cr, NI, Co, Nb and W; borides of Ti, V, Zr, W, Si, Mo, Nb, Cr, and Fe; and self-lubricating materials such as $MoS_2$ or organic materials such as polytetrafluoroethylene ("PTFE"). An improved process can be employed to create high strength, equiaxed coatings on metallic components or on non-conductive components that have been metallized to render them suitable for electroplating. In an alternative embodiment, the process can be used to electro-form a standalone article on a mandrel or other suitable substrate and, after reaching a desired plating thickness, to remove the free-standing electro-formed article from the temporary substrate.

In another aspect, the disclosure relates to an improved process for producing bicycle frame and component. In one embodiment, the process may include: (a) positioning a metallic or metallized work piece or a reusable mandrel/temporary substrate to be plated in a plating tank containing a suitable electrolyte; (b) providing electrical connections to the work piece and to one or several anodes; and (c) forming and electrodepositing a metallic material with an average grain size of less than 1,000 nanometer ("nm") on at least part of the surface of the work piece using a suitable DC or pulse electro-deposition process, such as described in PCT Publication No. WO 2004/001100 A1, the disclosure of which is incorporated herein by reference in its entirety.

In yet another aspect, the disclosure relates to an improved process for producing bicycle frame and component. In one embodiment, the process may include: (a) positioning a metallic or metalized work piece or a reusable mandrel/temporary substrate to be plated in a plating bath tank containing a suitable electrolyte; (b) providing electrical connections to the work piece and to one or several anodes; and (c) forming and electrodepositing a metallic material with an average grain size of less than 1,000 nm on at least part of the surface of the work piece using a suitable DC or pulse electro-deposition process, such as described in PCT Publication No. WO 2004/001100 AI. The metallic or metalized work piece will be treated with an organosilane on the side to the tool surface for the purpose of improving adhesion during co-cure.

In the process of one embodiment of the disclosure, an electro-deposited metallic coating optionally contains at least 2.5% by volume particulate, such as at least 5%, and up to 75% by volume particulate. The particulate may be selected from the group of metal powders, metal alloy powders, and metal oxide powders of Al, Co, Cu, In, Mg, Ni, Si, Sn, V, and Zn; nitrides of Al, B and Si; C (e.g., graphite or diamond carbides of B, Cr, Bi, Si, Ti, V, Zr, Mo, Cr, NI, Co, Nb and W; borides of Ti, V, Zr, W, Si, Mo, Nb, Cr, and Fe; $MoS_2$; and organic materials such as PTFE and other polymeric materials. The particulate average particle size is typically below 10,000 nm (or 10 μm), such as below 5,000 nm (or 5 μm), below 1,000 nm (or 1 μm), or below 500 nm.

The following list describes some suitable operating parameter ranges and nanostructured material properties according to one embodiment of the disclosure:

| Nanostructured Material Properties: | |
|---|---|
| Nanostructured Average Grain Size Minimum: | 2 nm; 4 nm; 10 nm |
| Nanostructured Average Grain Size Maximum: | 100 nm; 500 nm, 1,000 nm; 5,000 nm |
| Minimum Ratio Coating Thickness to Grain Size: | 6; 25; 100; 1,000 |
| Maximum Ratio Coating Thickness to Grain Size: | 10,000; 100,000; 1,250,000; 2,500,000; 25,000,000 |
| Minimum Yield Strength: | 200 MPa; 400 MPa; 500 MPa |
| Maximum Yield Strength: | 2,000 MPa; 2750 MPa; 3500 MPa |
| Minimum Resilience of the Nanostructured Layer: | 0.25 MPa; 1 MPa; 2 MPa; 5 MPa; 7 MPa |
| Maximum Resilience of the Nanostructured Layer: | 12 MPa; 25 MPa |
| Elastic Limit Range: | 0.75%-5.00% |
| Particulate Content Range by Volume: | 2.5% to 75% |
| Nanostructured Metallic Layer Thickness Minimum: | 10 μm |
| Nanostructured Metallic Layer Thickness Maximum: | 5 mm; 1 cm; 5 cm |

| Operating Parameters: | |
|---|---|
| Nanostructured Material Deposition Rate Range: | 10-500 μm/hr |
| Duty Cycle Range: | 5 to 100% |
| Deposition Temperature Range: | 10° C. to 100° C. |

In the process of one embodiment of the disclosure, dispersion strengthening of nanostructure materials may be performed by a subsequent heat-treatment.

An embodiment of the disclosure provides for electro-deposited fine-grained layers, having a thickness of at least 0.030 mm, such as more than 0.05 mm or more than 0.1 mm, on surfaces of appropriate components.

Electro-deposited nanostructure materials of an embodiment of the disclosure may have an average grain size under 5 μm (or 5,000 nm), such as in the range of 4 nm to 750 nm, in the range of 10 nm to 500 nm, or in the range of 15 nm to 300 nm.

Nanostructure materials of an embodiment of the disclosure may have a resilience of at least 0.25 MPa, such as at least 1 MPa, at least 2 MPa, at least 5 MPa, or at least 7 MPa, and up to 25 MPa.

Nanostructure materials of an embodiment of the disclosure may have an elastic limit of at least about 0.75%, such as greater than about 1.0% or greater than 1.5%, and up to 2.00%.

To ensure part reliability according to one embodiment of the disclosure, it may be desirable to maintain an average thickness to average grain size ratio of a nanostructured material layer at a minimum value of 6, such as greater than 25, greater than 500, or greater than 1,000, and up to 1,250,000 and as much as 12,500,000 or 25,000,000.

According to another embodiment, the nano-crystalline material has a thickness ranging from 0.0005 inch to 0.010 inch, a modulus of resilience ranging from 150 GPa and 250 GPa, a yield strength of 600 MPa to 1100 GPa, a hardness of 250 to 500 VHN, an elastic strain limit ranging from 0.33% and 2.5%, and a weight between 5% and 40% of the total weight of the frame or bicycle component. The layer of nano-crystalline material has a microstructure with an average grain size between 5 nm and 150 nm.

According to an embodiment of the disclosure, patches or sections of nanostructure materials may be formed on selected areas of components without the need to coat an entire article.

According to an embodiment of the disclosure, patches, sleeves or structural shells of nanostructure materials, which need not be uniform in thickness, may be electro-deposited in order to form a thicker structural shell on selected sections or sections particularly prone to heavy use, wear, or impact.

In one embodiment an aluminum or magnesium alloy substrate or tube in lieu of a polymer substrate may be completely encapsulated by nano-structured material including nanocrystalline metals. The encapsulation may increase the stiffness of the structure, and prevent the possibility of galvanic corrosion of the aluminum or magnesium alloy substrate.

In some embodiments the aluminum or magnesium alloy substrate need not be encapsulated symmetrically. The location of the substrate can be chosen depending on the particular application. The encapsulation along the perimeter can be controlled during the deposition process or could be later machined to the design requirement. In some exemplary embodiments the encapsulation can vary from 0 to 1.0 mm.

Other aspects and embodiments of the disclosure are also contemplated. The foregoing summary and the following detailed description are not meant to restrict the disclosure to any particular embodiment, but are merely meant to describe some embodiments of the disclosure.

Nanostructured Materials

Certain embodiments of the disclosure relate to nanostructured materials that can be used for a bicycle frame and component. A microstructure and resulting characteristics of nanostructured materials can be engineered to meet performance criteria for a variety of bicycle frames and components. In some instances, engineering of nanostructured materials can involve enhancing or optimizing a set of characteristics, such as strength, strength-to-weight ratio, resilience, fracture toughness, vibration damping, hardness, ductility, and wear resistance. In other instances, engineering of nanostructured materials can involve trade-offs between different characteristics.

According to some embodiments of the disclosure, a nano-structure coating material has a relatively high density of grain boundaries as compared with other types of materials. This high density of grain boundaries can translate into a relatively large percentage of atoms that are adjacent to grain boundaries. In some instances, up to about 50 percent or more of the atoms can be adjacent to grain boundaries. Without wishing to be bound by a particular theory, it is believed that this high density of grain boundaries promotes a number of desirable characteristics in accordance with the Hall-Petch Effect. In order to achieve this high density of grain boundaries, the nanostructure material is typically formed with a relatively small grain size. Thus, for example, the nanostructure material can be formed with a grain size in the submicron range, such as in the nm range. As the grain size is reduced, a number of characteristics of the nanostructure material can be enhanced. For example, in the case of nickel, its hardness can increase from about 140 Vickers for a grain size greater than about 5 μm to about 300 Vickers for a grain size of about 100 nm and ultimately to about 600 Vickers for a grain size of about 10 nm. Similarly, an ultimate tensile strength of nickel can increase from about 400 MPa for a grain size greater than about 5 μm to 1,000 MPa for a grain size of about 100 nm and ultimately to over 2,000 MPa for a grain size of about 10 nm.

According to some embodiments of the disclosure, a nano-structure material includes a set of crystals that have a size in the nm range and, thus, can be referred to as a nano-crystalline material. However, as described herein, nanostructure materials having desirable characteristics can also be formed with larger grain sizes, such as in the submicron range. A microstructure of the nanostructure material can be engineered to cover a wide range of microstructure types, including one that is quasi-isotropic, one that is slightly-anisotropic, and one that is anisotropic and highly textured. Within this range of microstructure types, a reduction in size of the set of crystals can be used to promote a number of desirable characteristics.

Particularly useful nanostructure materials include those that exhibit a set of desirable characteristics, such as high strength, high strength-to-weight ratio, high resilience (e.g., defined as $R=\sigma^2/2E$), high fracture toughness, high elasticity, high vibration damping, high hardness, high ductility, high wear resistance, and low friction. For example, in terms of strength, particularly useful nanostructure materials include those having a yield strength that is at least about 200 MPa, such as at least about 500 MPa, at least about 1,000 MPa, or at least about 1,500 MPa, and up to about 2,750 MPa, such as up to about 2,500 MPa. In terms of resilience, particularly useful nanostructure materials include those having a modulus of resilience that is at least about 0.25 MPa, such as at least about 1 MPa, at least about 2 MPa, at least about 5 MPa, or at least about 7 MPa, and up to about 25 MPa, such as up to about 12 MPa. In terms of elasticity, particularly useful nanostructure materials include those having an elastic limit that is at least about 0.75 percent, such as at least about 1 percent or at least about 1.5 percent, and up to about 2 percent. In terms of hardness, particularly useful nanostructure materials include those having a hardness that is at least about 100 Vickers, such as at least about 300 Vickers, at least about 400 Vickers, or at least about 500 Vickers, and up to about 2,000 Vickers, such as up to about 1,000 Vickers, up to about 800 Vickers, or up to about 600 Vickers. In terms of ductility, particularly useful nanostructure materials include those having a tensile strain-to-failure that is at least about 1 percent, such as at least about 3 percent or at least about 5 percent, and up to about 15 percent, such as up to about 10 percent or up to about 7 percent.

Nanostructure materials according to various embodiments of the disclosure can be formed of a variety of materials. Particularly useful materials include: (1) metals selected from the group of Ag, Au, Cd, Co, Cr, Cu, Fe, Ir, Ni, Pb, Pd, Pt, Rh, Sn, and Zn; (2) metal alloys formed of these metals; and (3) metal alloys formed of these metals along with an alloying component selected from the group of B, C, Mn, Mo, P, S, Si, and W.

In some instances, a nanostructure material can be formed as a metal matrix composite in which a metal or a metal alloy forms a matrix within which a set of additives are dispersed. A variety of additives can be used, and the selection of a specific additive can be dependent upon a variety of considerations, such as its ability to facilitate formation of the nanostructured material and its ability to enhance characteristics of the nanostructured material. Particularly useful additives include particulate additives formed of: (1) metals selected from the group of Al, Co, Cu, In, Mg, Ni, Sn, V, and Zn; (2) metal alloys formed of these metals; (3) metal oxides formed of these metals; (4) nitrides of Al, B, and Si; (5) C, such as in the form of graphite, diamond, nanotubes, and Buckminster Fullerenes; (6) carbides of B, Cr, Bi, Si, Ti, V, Zr, Mo, Cr, NI, Co, Nb and W; borides of Ti, V, Zr, W, Si, Mo, Nb, Cr, and Fe; (7) self-lubricating materials, such as $MoS_2$; and (8) polymers, such as PTFE. During formation of a nanostructure material, a set of particulate additives can be added in the form of powders, fibers, or flakes that have a size in the submicron range, such as in the nm range. Depending on specific characteristics that are desired, the resulting nanostructure material can include an amount of particulate additives that is at least about 2.5 percent by volume, such as at least about 5 percent by volume, and up to about 75 percent by volume.

Table 1 below provides examples of classes of nanostructure materials that can be used to make a bicycle frame and component as are described herein. Table 1 also sets forth specific characteristics that are particularly enhanced for these classes of nanostructure materials. As used below and subsequently herein, the notation "n-$X_1$" refers to a nanostructure material formed of material $X_1$, and the notation "n-$X_1 X_2$" refers to a nanostructure material formed of an alloy of material $X_1$ and material $X_2$

TABLE 1

| Nanostructured Materials | Characteristics |
|---|---|
| n-Ni, n-Ni Co, n-Ni Fe | high strength and high fracture toughness |
| n-Co P, n-Ni P, and n-Co P + $B_4$C composites | high degree of hardness and wear resistance |
| n-Cu and n-Brass | high strength and high fracture toughness |
| n-Zn, n-Zn Ni, n-Zn Fe | high corrosion resistance |
| Metal Composites: n-Ni + $MoS_2$ or n-Ni Fe + $MoS_2$ | low coefficient of friction |
| Precious Metals: n-Ag, n-Au, n-Pt, n-Au—Ag, n-Au—Pd, n-Au—Cu, n-Au—Ni and typical alloys thereof | high hardness and made of precious metals and precious metal alloys (10, 12, 14, 18, 22, 24-ct) |

Nanostructure materials can be formed using a variety of manufacturing techniques, such as sputtering, laser ablation, inert gas condensation, oven evaporation, spray conversion pyrolysis, flame hydrolysis, high energy milling, sol gel deposition, and electro-deposition. According to some embodiments of the disclosure, electro-deposition can be particularly desirable, since this manufacturing technique can be used to form nanostructure materials in a manner that is effective in terms of cost and time. Moreover, by adjusting electro-deposition settings, a microstructure of a nanostructure material can be controlled, thus allowing fine-tuned control and reproducibility of resulting characteristics of the nanostructure material.

Implementations of Nanostructure Coated Bicycle Frames and Components

The foregoing provides a general overview of some embodiments of the disclosure. Some examples of nanostructure materials and associated coated components are further described below. The examples should not be construed as limiting the disclosure, as the examples merely provide specific methodology useful in understanding and practicing some embodiments of the disclosure.

EXAMPLE 1

Mechanical Characteristics of Nanostructured Materials

Measurements of mechanical characteristics of six different materials were made in accordance with standard protocols. Two of these materials are steel-based materials, namely Maraging Steel (Carpenter 465) and Steel 17-4 PH, while three of these materials are titanium-based materials, namely Ti 6AI-4V (Grade 5), β-Titanium (15-3-3-3), and SP-700 Ti. The remaining material is a nanostructured material, namely n-Ni 20 Fe which has an average grain size of about 20 nm, and a composition of about 80+/−10% percent by weight of Ni and about 20+/−10 percent by weight of Fe, and is available from PowerMetal Technologies Inc., Carlsbad, Calif., USA.

Specifically, an electrolyte composition included a modified Watts bath for nickel containing 300 g/l nickel sulfate, 45 g/l nickel chloride, 45 g/l boric acid ($H_3BO_3$), 2 g/l saccharin, and 3 ml/l NPA-91. To form n-Ni 20 Fe, 12 g/l $FeCl_2.H_2O$, 81 g/l $FeSO_4.7H_2O$, and 9 g/l Na-Citrate are added to the modified Watts bath. Standard levelers and brighteners were employed. Inco nickel "R"-rounds and electrolytic iron-chips were used as anode material. Nanostructured n-Ni 20 Fe alloy was deposited using DC (100% duty cycle) at a current density of about 100 mA/$cm^2$ and a temperature of about 60° C.

Referring to Table 2 below, results of the measurements are shown. As can be appreciated with reference to Table 2, nanostructured n-Ni 20 Fe has a number of mechanical characteristics that render it desirable for sports applications, including a relatively high yield ($\sigma_y$) and ultimate strength (UTS), a relatively high strength-to-weight ratio (specific strength), a relatively high resilience (modulus of resilience), a relatively high elasticity (elastic limit), a relatively high hardness (HVN), a relatively high ductility (tensile strain-to-failure %), and a relatively high wear resistance (e.g. Taber Wear Index). As compared with the steel and titanium alloys that were tested, nanostructured n-Ni 20 Fe exhibited the greatest resilience, which can translate into an enhanced Coefficient of Restitution when implemented in the construction of metalwood heads such as drivers, fairway woods, hybrid and utility clubs.

TABLE 2

Material Property Comparisons

| | Maraging Steel (Carpenter 465) | Steel 17-4 PH | Ti6Al—4V (Grade 5) | β-Titanium (15-3-3-3) | Ti (SP-700) | n-Ni 20 Fe (Nano-structured) |
|---|---|---|---|---|---|---|
| Density g/$cm^3$ | 7.8 | 7.8 | 4.4 | 4.7 | 4.5 | 8.3 |
| Young's | 200 (29.0) | 198 (28.6) | 114 (16.5) | 103 (15.0) | 110 (16.0) | 185 (26.9) |

TABLE 2-continued

Material Property Comparisons

| | Maraging Steel (Carpenter 465) | Steel 17-4 PH | Ti6Al—4V (Grade 5) | β-Titanium (15-3-3-3) | Ti (SP-700) | n-Ni 20 Fe (Nano-structured) |
|---|---|---|---|---|---|---|
| Modulus GPa (Msi) | | | | | | |
| Specific Modulus GPa/g/cm$^3$ | 25.6 | 25.4 | 25.9 | 21.9 | 24.4 | 22.3 |
| Yield Strength MPa (ksi) | 1655 (240) | 870 (126) | 790 (115) | 1000 (145) | 970 (141) | 1785 (260) |
| Specific Strength, MPa/g/cm$^3$ | 212 | 111 | 179 | 213 | 216 | 215 |
| Modulus of Resilience psi | 993 | 278 | 401 | 701 | 621 | 1258 |
| Elastic Limit (%) | 0.83 | 0.44 | 0.69 | 0.97 | 0.88 | 0.90 |
| Hardness, HVN | 530 | 325 | 340 | 370 | 291 | 600 |
| Tensile Strain to Failure, % elongation | N/A | 6.0% | 15% | 7.0% | 19% | >5% |
| Taber Wear CS-17 | N/A | N/A | N/A | N/A | N/A | 35 |

EXAMPLE 2

Electro-Formed Bicycle Frame and Component

According to some embodiments of the disclosure, it may be desirable to produce a fine-grained or nanostructured bicycle frame and component by electro-forming without the use of a permanent substrate. In this case, a fine-grained metallic material is electro-formed on a suitable temporary cathode or mandrel, which is removed from the article in a suitable manner, such as mechanically, thermally (e.g., melting of, for example, a wax-based temporary substrate), or dissolution (e.g., chemically dissolving, for example, Al, Cu, Plastic, or the like substrates).

As a demonstration of the production of electro-formed components, a freestanding shaft component comprised entirely of fine-grained, n-Ni Mo (Mo content ≦2%) was electro-formed on a Cr-plated steel mandrel ($OD_1$=0.600 inches, tapering down to $OD_2$=0.335 inches over a length of 42 inches) in a modified Watts nickel bath and using a Dynatronix (www.dynatronix.com, Dynanet PDPR 40-100-400) pulse power supply. An electrolyte used comprised 300 g/l nickel sulfate, 45 g/l nickel chloride, 45 g/l boric acid, 4 g/l sodium molybdate, 2 g/l saccharin, and 5 ml/l NPA-91 (www.atotechUSA.com supplied wetting agent). Standard levelers, brighteners, stress relievers, and chelating agents were employed, and nickel "R"-rounds (www.inco.com) were used as an anode material. The electroplating conditions and metallic layer properties used are summarized in Table 4.

TABLE 4

Electro-plating Conditions

| | |
|---|---|
| Deposition Temperature [° C.] | 62 |
| Duty Cycle [%] | 30 |
| Deposition Rate [μm/hr] | 75 |
| Average Coating Thickness: [μm] | 325 |
| Average Grain Size: [μm] | 0.035 |
| Ratio Coating Thickness/Grain Size | 9,286 |
| Yield Strength [MPa] | 1035 |
| Hardness [Vickers] | 540 |

The electro-formed n-Ni Mo component was removed from the temporary substrate. Due to the partial shielding of the anodes, the shaft wall thickness increased from about 300 μm at the handle ($OD_1$) to about 380 μm at the tip ($OD_2$).

Other parts composed of fine-grained nickel, cobalt, or iron-based alloys with different geometries, including tubes, plates, shells, and the like, were also successfully formed using the same process, and such parts can be used as components directly or manufactured into the constituent components through standard processing techniques.

Another method of forming an electroformed component is to use a conductive preform of the part to be plated with nanocrystalline alloy. In this case, a fine grained metallic material is electroformed onto the preform, then the electroplated preform is removed and an organosilane adhesion promoter is applied to the underside of the preform for improved adhesion to the substrate.

EXAMPLE 3

Bicycle Frames and Components Formed Via a Nanostructured Nickel Electro-Deposit Along Graphite/Epoxy FRP Composite Tubes Various non-metallic materials are commonly used in the manufacture of bicycle frames and components including thermoplastic and thermoset polymers, fiber-reinforced plastics (FRP's), and carbon fiber composites. These materials typically include polymeric resin matrix composites employing materials including: carbon fibers, aramid fibers, polyethylene fibers, boron fibers, fiberglass fibers, ceramic fibers, strengthening particulates and various epoxies and/or thermoplastics including, but not limited to, polypropylene, polyethylene, polystyrene, vinyls, acrylics, Nylon®, and polycarbonates.

Graphite fiber uniaxial tape and bi and tri-axial weaves in a polymer matrix (e.g., epoxy), typically called prepreg or FRP composites, are suitable for certain components. To demonstrate the fabrication of electro-deposited components, hybrid metal/polymer shaft components were prepared using FRP composite tubes as substrate. This approach allows a combination of the favorable properties of fine-grained or nanostructured materials to be combined with the favorable properties of FRP composites, thus leading to products with new properties, and improved performance characteristics when compared to conventional all-composite or all-metal designs. As a variety of articles can be rendered suitable for electro-plating by applying a thin layer of a conductive material (e.g., by electro-less deposition, physical or chemical vapor deposition, or applying electrically conductive paints by various suitable means). It should be understood that embodiments of the disclosure encompass the use of virtually any substrate material, which need not be electrically conductive, including neat resins of thermoplastic or thermoset polymers with amorphous or semi-crystalline microstructures.

Commercially available graphite shafts (e.g., Penley Graphite Light LS S-Flex and Penley G2-85×-Flex graphite shafts) were used for the demonstration of this manufacturing technique. The S-flex FRP components were characterized, stripped of paint, and subsequently electro-plated with coarse, fine-grained, and nanostructured materials. Plated shafts and un-plated X-flex shafts having a total overall weight of 89 g were performance tested. Structural shells of nanocrystalline nickel were electro-deposited along the outside of the S-flex graphite golf club shafts ($OD_1$=0.586 inches, tapering down to $OD_2$=0.368 inches over a length of 40.5 inches) in a modified Watts nickel bath and using a Dynatronix (Dynanet PDPR 20-30-100) pulse power supply. The starting mass of each shaft was 71.5 g, prior to electro-plating, and approximately 6.0 g of paint was stripped off. The electro-plating procedure comprised: (1) applying a thin electro-less nickel plating to enhance the electrical conductivity using a procedure and chemicals provided by MacDermid Industrial Products (www.macindustrialproducts.com) to achieve an average metal film thickness of 0.4 µm at a deposition rate of 1.7 µm/hr; and (2) electro-plating to form the fine-grained or coarse-grained deposit by varying the duty cycle and the peak current density. The electrolyte composition and plating set up used were similar to that described in Example 3. The weight of the metal coating was approximately 20 g. The electro-plating conditions and metallic layer properties used are summarized in Table 6. A comparison of shaft properties is summarized in Table 7.

TABLE 6

| Electro-plating Conditions | | |
|---|---|---|
|  | Fine-Grained | Coarse-Grained |
| Deposition Temperature [° C.] | 60 | 60 |
| Duty Cycle [%] | 25 | 100 |
| Deposition Rate [m/hr] | 50 | 8.6 |
| Average Coating Thickness: [µm] | 55 | 58 |
| Average Grain Size: [µm] | 0.025 | 10 |

TABLE 6-continued

| Electro-plating Conditions | | |
|---|---|---|
|  | Fine-Grained | Coarse-Grained |
| Ratio Coating Thickness/Grain Size | 2,200 | 5.8 |
| Yield Strength [MPa] | 900 | 276 |
| Hardness [Vickers] | 580 | 140 |

TABLE 7

| Comparison of Shaft Properties | | | |
|---|---|---|---|
| Shaft Characteristics | Standard Graphite Shaft | Fine Grained | Coarse Grained |
| Graphite Shaft Weight Before Coating [g] | 88.5 | 71.6 | 71.8 |
| Deflection Before Coating [Flex Rating] | X | S | S |
| Torque Before Coating [°] | 4.4 | 5.4 | 5.1 |
| Plating weight [g] | N/A | 19.2 | 20.0 |
| Total weight [g] | 88.5 | 88.8 | 89.8 |
| Deflection After Coating | X | X | X |
| Torque After Coating [°] | 4.4 | 3.6 | 4.0 |

Exemplary Coated Bicycle Frames and Components

In one exemplary embodiment, a bicycle frame, such as bicycle frame 102 described above, may be coated, in whole or in part, with a nanostructured/nano-crystalline material. Coatings may vary in thickness across coated areas of the bicycle frame, such as, for example, to provide increased strength, hardness, and/or durability to specific areas of the frame based on performance requirements such as stiffness, wear resistance, or other parameters. In an exemplary embodiment substrate thicknesses may range from 0.003 to 0.500, with applied coating thicknesses ranging from 0.0001 inch to 0.100 inch.

Typical bicycle frames, such a bicycle frame 102 described above, are manufactured using tubes or in the form of tubular structures. In some embodiments these tubes, such as metal, thermoset, or thermoplastic tubes, may be coated with a nanocrystalline material to improve torsional stiffness of the tube. Tubes made of thermoset material may be lightened by reducing the cross-sectional thickness of the tube by replacing layers of the thermoset substrate and adding a nano-crystalline material to retain the stiffness of the thicker substrate material. Nano-crystalline materials may also be used to improve the performance of a frame tube designed with compound curvatures that can be produced through several methods such as injection molding, extrusion and post processing modification. Frames made of multi-materials may also be coated in whole or in part with a nano-crystalline material to enhance overall strength and durability. Some or all of the multi-material frame may be manufactured by an injection molding process or bladder molding process.

Bicycle frames suitable for coating may include frames made of metals such as steel, aluminum, titanium, or other metals and alloys. Alternately frames may be made from thermoplastic polymers or thermoset polymers, including filled and or composite polymers, or carbon composite materials. All or part of the frame tube components may be coated with a nano-crystalline material or materials. For example, Ni—Fe may be coated on the inside of a tube or other frame structure in order to take advantage of the tension stress, and Ni may be coated on the outside in order to take advantage of the compression stress.

The stiffness or ride characteristics of a bicycle may be adjusted by selectively applying a nano-crystalline material to a bicycle component. For example, the nano-crystalline material may be applied so that it reduces the energy dampening effect of softer materials such as composites, aluminum or aluminum alloys, or soft steels.

In addition to bicycle frames, various other bicycle components may be coated, in whole or in part, with a nano-crystalline material. Components may be made from metals, thermoplastic polymers, thermoset polymers, including filled and or composite polymers, and/or carbon composite materials.

Many bicycle components may include tubes or tubular structures (including frames as previously described above). The tubes may be coated on all or a portion of the outside, the inside, or the inside and outside, depending on the performance requirements. Coating nano-crystalline material in variable thickness across the tube or component may be done to add stiffness in required areas. The ride stiffness may be adjusted by applying a nano-crystalline material. Combining unique tube shapes that provide increased strength and stiffness with an application of nano-crystalline metal may be done to replace steel or other substrates. The nano-crystalline material may be applied so that the resulting tube or component has increased the energy dampening compared to softer materials such as composites, aluminum, or soft steels.

In some embodiments the tubes, such as thermoset tubes, may be coated with a nano-crystalline material to improve torsional stiffness of the tube. Tubes made of thermoset material may be lightened by reducing the cross-sectional thickness of the tube by replacing layers of the thermoset substrate and adding a nano-crystalline material to retain the stiffness of the thicker substrate material.

Representative substrates for bicycle components may include materials such as Epoxies, PEI, Nylon, ABS, PP, PET, PEEK, PES, PVC, Acetal, PPO, PPE, PC/ABS, Aluminum, titanium, magnesium, alloys of various metals, or other thermoplastic or thermoset materials, either filled or unfilled.

Some bicycle components, such as sprockets, gears, brakes, wires, and other components are subject to wear due to friction or abrasion. These components may be enhanced by applying a thin coating of high wear, low friction nano-crystalline material onto wear components to increase wear performance, heat dissipation, and/or to lighten weight.

Bicycle wheels are subject to wear due to applied braking forces and other forces. A thin coating of nano-crystalline material may be applied to the bicycle wheel as a heat dissipation/wear enhancement component in order to allow for use of carbon composite or thermoplastic wheels. In typical contemporary wheel implementations, the temperature rise between the brake pads and wheel is too great to allow for carbon composites and thermoplastics to be used; however, application of a thin layer of nano-crystalline material to thermoplastic or thermoset wheels may be used to control the temperature of the bicycle wheel during braking. Spoked wheels may also benefit from application of a thin layer of nano-crystalline material to all or a portion of the spokes to improve stiffness and tensile strength.

As set forth above, typical bicycles are manufactured with tubular components, such as down tubes, seat tubes, top tubes, head tubes, chain stays, seat stays, as well as others. Coating all or a portion of a tubular component with a nano-crystalling material may improve performance, durability, wear resistance, strength, and other parameters. A thin layer of nano-crystalline material may be applied to improve stiffness so that the diameter of the tubes can be reduced. A thin layer of nano-crystalline material may be applied in various thicknesses in order to modify the performance, stiffness, and ride of the bike. For thermoplastic tubes, a thin layer of nano-crystalline material may be applied to improve the stiffness in order to achieve the same performance as a metal tube, such as an aluminum, steel, or composite tube.

For thermoplastic tubes, a thin layer of nano-crystalline material may be applied to improve stiffness where the tubes have a profile shape that geometrically improves the stiffness. Likewise, a thin layer of nano-crystalline material may be applied to thermoplastic tubes to improve the stiffness where the tubes have internal ribs that geometrically improve the stiffness. The ribs can be produced through an injection molding or an extrusion process. A thin layer of nano-crystalline material may be applied to thermoplastic tubes to improve the wear resistance of all substrates, but particularly the wear resistance of thermoplastic and thermoset materials. Likewise, a thin layer of nano-crystalline material may be applied to thermoplastic tubes to improve the buckling performance of tubes exposed to in line compression.

A thin layer of nano-crystalline material may be applied to thermoplastic tubes to improve the anisotropic behavior of the frame, especially when the frame is based on a composite substrate.

Tubes made of metal substrates may likewise benefit from application of a nano-structured material. For example, a thin layer of nano-crystalline material may be applied to an aluminum substrate to improve the cyclic fatigue.

Typical bicycle frames are constructed with joints using attachments such as lug construction, welding, brazing, adhesive bonding, and other joint techniques. These joints may be improved through use of nano-crystalline material. For example, a thin layer of nano-crystalline material may be applied to a head tube lug to improve strength and/or fatigue life. A thin layer of nano-crystalline material may be applied to a thermoplastic material in order to match the performance of a typical current lug design. A nano-crystalline material may be used in closely fitted joints as a bonding agent for the lug to tube connection.

For injection molded thermoplastic materials, use of a nano-crystalline material coating on injection molded thermoplastic materials may allow the design of the joints to be less constrained by manufacturing processes. Likewise, for lightweight materials such as thermoplastic materials, application of a thin layer of nano-crystalline material to the lug may allow for equivalent strength and decreased weight. Nano-crystalline materials may be used on insert molded thermoplastic joints. The inserts can be made of any type of metal, thermoset, or thermoplastic material.

Typical bicycles have front forks configured to attach the front wheels. Forks and fork components may benefit from application of a thin layer of nano-crystalline material to improve wear and impact resistance. Typical bicycles also have a stem. The stem may benefit from application of a thin layer of nano-crystalline material to improve strength and impact resistance.

Figure 9:
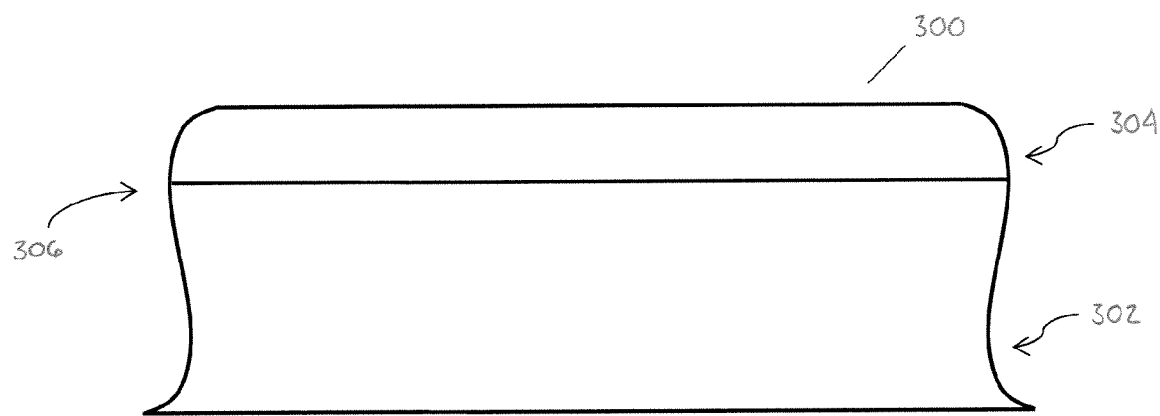
FIG. 9 illustrates a cross-sectional schematic view of a portion of a bicycle component with nanostructured material providing a structural shell or coating.

With reference to FIG. 9, a cross-sectional view of a portion 300 of a bicycle component is illustrated. The portion is implemented in accordance with a multi-layered design and includes a first layer 302 and a second layer 304 which at least partly covers a surface 306 of the first layer. The second layer 304 can be formed adjacent to the first layer 302 via electro-deposition or any other suitable manufacturing technique. A conductive interface can be applied to the surface of the first layer for better adhesion of the second layer to the first layer. The first layer is implemented as a substrate and is formed of any suitable material, such as a metal, a metal alloy, a polymer, or a composite. The second layer is implemented as a coating and is formed of a nanostructured material.

As illustrated in FIG. 9, the nanostructured material is substantially uniformly distributed across the surface 306. Such uniformity in distribution can serve to reduce or prevent the occurrence of a weak spot at or near a section of the portion 300 that includes a lesser amount of the nanostructured material than another section. However, depending upon specific characteristics desired for the portion 300, the distribution of the nanostructured material can be varied from that illustrated in FIG. 9. Thus, for example, the nanostructured material can be distributed non-linearly across the surface 306 to match a stress profile of the first layer 302 under service loads or meet a set of mass characteristics requirements.

Figure 10:
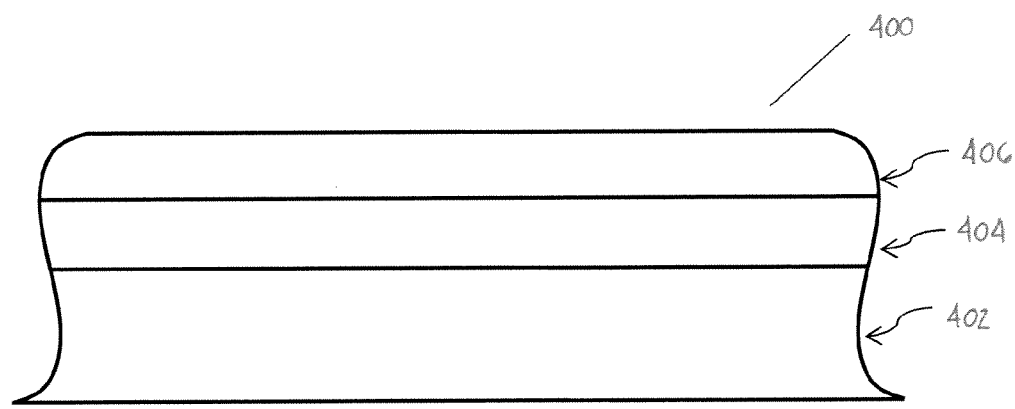
FIG. 10 illustrates a cross-sectional schematic view of a portion of a bicycle component with a nanostructured material in a sandwich construction.

With reference to FIG. 10, a cross-sectional schematic view of a portion 400 of a bicycle frame and component is illustrated. The portion 400 is implemented in accordance with a multi-layered design and includes a first layer 402, a second layer 404 that is adjacent to the first layer, and a third layer 406 that is adjacent to the second layer. At least one of the layers 402, 404, and 406 is formed of a nanostructured material. The remaining layers are formed of any suitable materials, such as metals, metal alloys, polymers, or composites (e.g., a carbon composite). A conductive interface can be applied to the surface of the layer adjacent to the layer formed of nanostructured material for better adhesion of the nanostructured material layer.

Figure 11:
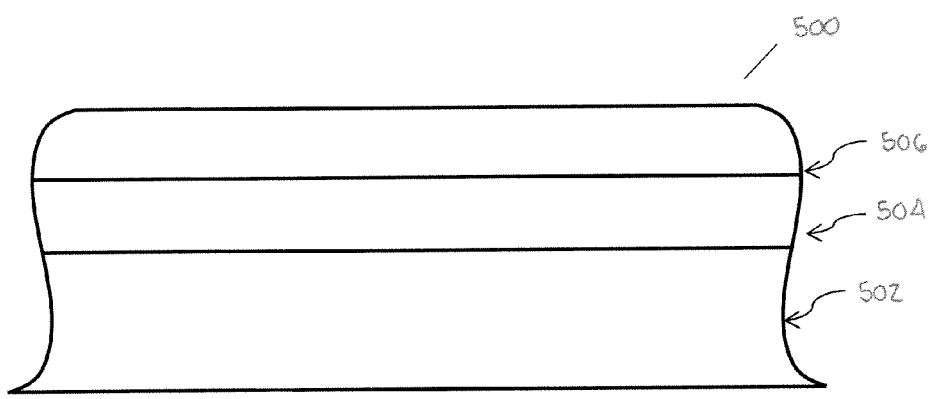
FIG. 11 illustrates a cross-sectional schematic view of a bicycle component with a nanostructured material in a sandwich construction with different nanostructured materials on the top and bottom.

With reference to FIG. 11, a cross-sectional schematic view of a portion 500 of a bicycle frame and component is illustrated. Similar to portion 400, portion 500 is implemented in accordance with a multi-layered design and includes a first layer 502, a second layer 504 that is adjacent to the first layer, and a third layer 506 that is adjacent to the second layer. At least one of the layers 502, 504, and 506 is formed of a nanostructured material. In this embodiment, the first layer 502 and the third layer 506 can be formed of the same nanostructured material or different nanostructured materials flanking layer 504. A conductive interface can be applied to the surfaces of the layer 504 for better adhesion of the nanostructured material layers 502 and 506.

Figure 12:
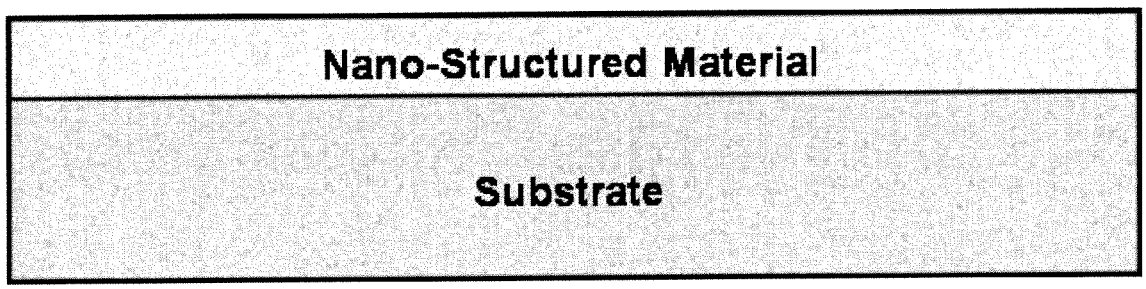
FIG. 12 illustrates a cross-sectional schematic view of a bicycle component with a nanostructured material providing a structural shell or coating over a substrate or core.
Figure 13:
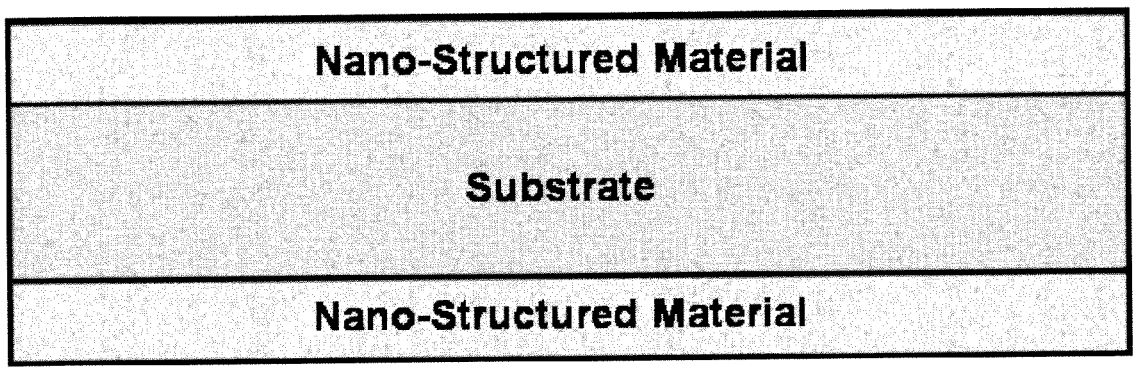
FIG. 13 illustrates a cross-sectional schematic view of a bicycle component with a nanostructured material in a sandwich construction on the top and bottom and a substrate or core.
Figure 14:
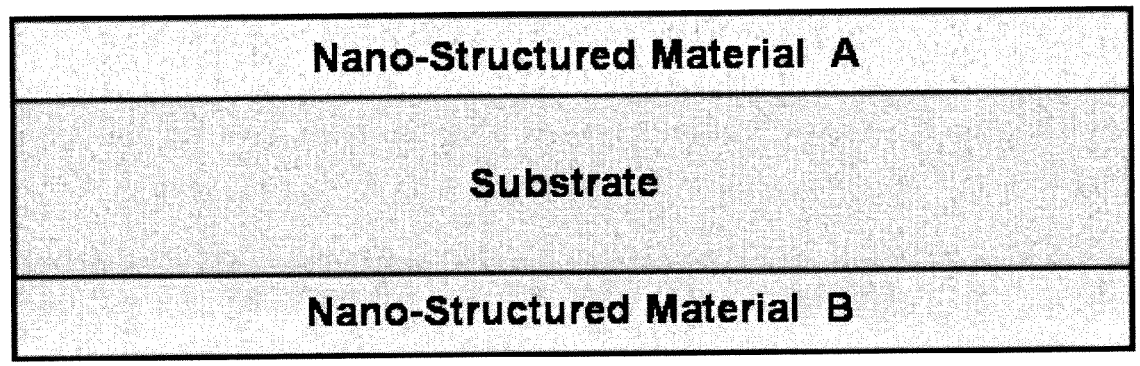
FIG. 14 illustrates a cross-sectional schematic view of a bicycle component with a nanostructured material in a sandwich construction with different nanostructured materials on the top and bottom and a substrate or core.
Figure 15:
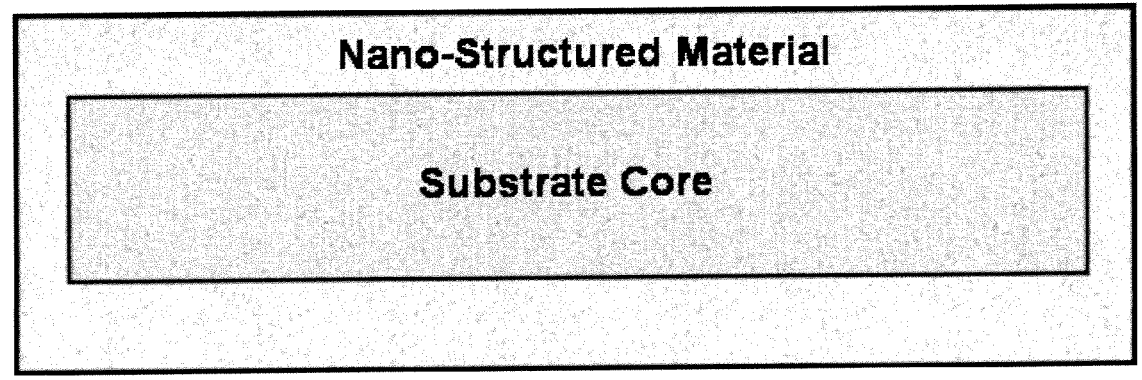
FIG. 15 illustrates a cross-sectional schematic view of a bicycle component with nanostructured materials fully encapsulating a substrate or core.

With reference to FIGS. 12-15, cross-sectional schematic views of a portion of a bicycle frame and component, which is similar to the those described above with respect to FIGS. 9-11, are illustrated. FIG. 12 illustrates a bicycle frame and component with a nanostructured material and a substrate. FIG. 13 illustrates a bicycle frame and component with a nanostructured material in a sandwich construction flanking a substrate. FIG. 14 illustrates a bicycle frame and component with a nanostructured material in a sandwich construction with different nanostructured materials flanking a substrate. FIG. 15 illustrates a bicycle frame and component with nanostructured materials fully encapsulating a substrate. It should be appreciated that both the nanostructured material and substrate shown in FIGS. 12-15 can have a variable thickness. Similar to the FIGS. 9-11, a conductive interface can be applied to the surface of the substrate adjacent to the nanostructured material for better adhesion of the nanostructured material to the substrate.

Regarding FIG. 14, the deposition process is carried out in two stages. In the first stage, a nanostructured metal having composition A is deposited. In the second stage of the process, nanostructured metal having composition B is deposited. The choice of the alloy composition will depend on the exact design requirement. For example, in some embodiments it is suggested that the alloy compositions be chosen such that the strength of alloy B is greater than alloy A. In another embodiment, it is suggested that alloy B have higher fracture toughness as compared to alloy A. In still another embodiment, it is suggested that alloy A have a higher hardness as compared to alloy B. In any case, it should be pointed out that whether alloy A or alloy B is used as an impact surface will depend on the properties of the individual compositions.

Figure 16:
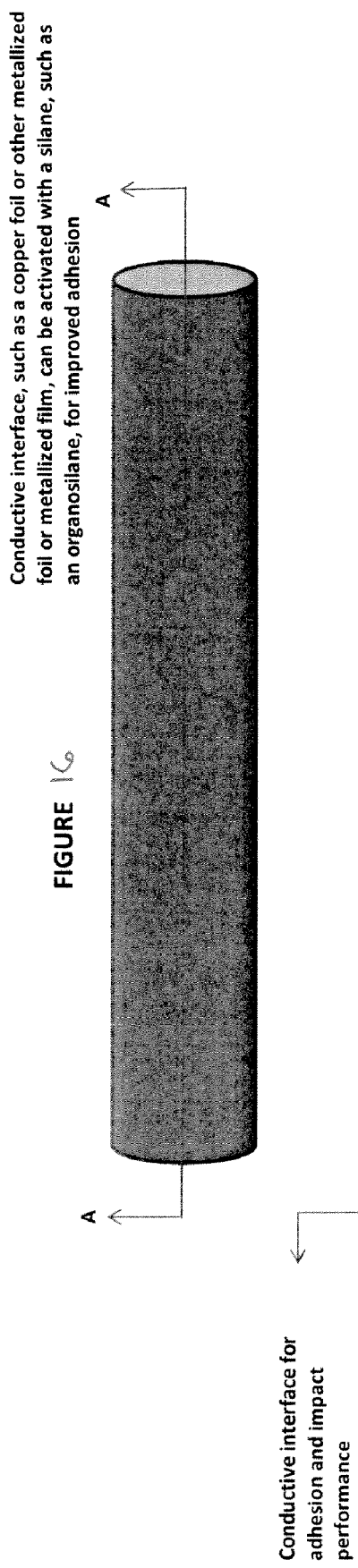
FIGS. 16-19 illustrate a conductive tie layer being used during a co-cure process to increase adhesion of nano-crystalline material to a bicycle component.
Figure 17:
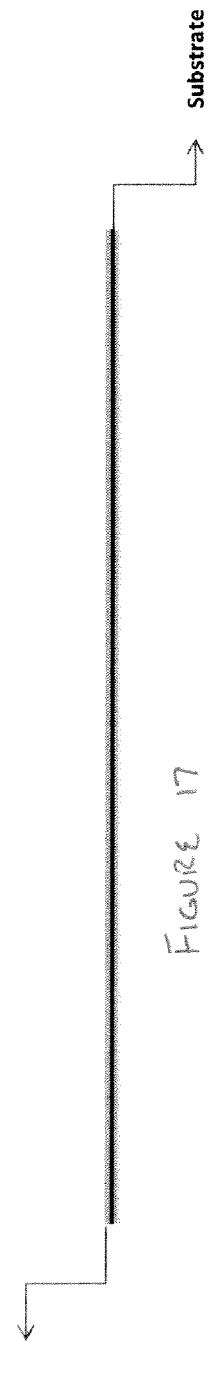
Figure 18:
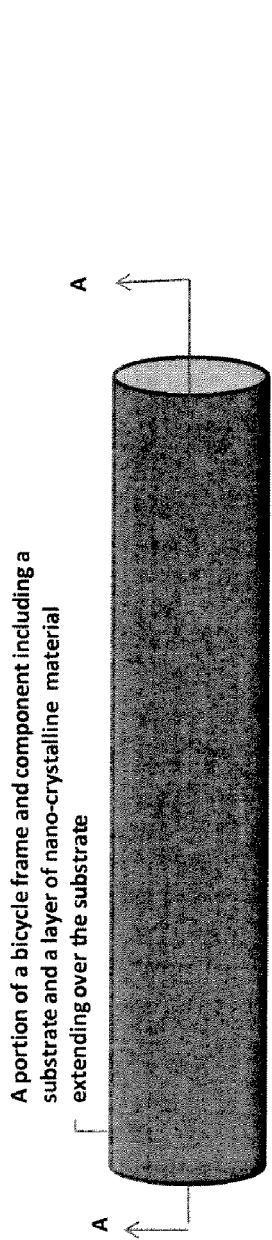
Figure 19:
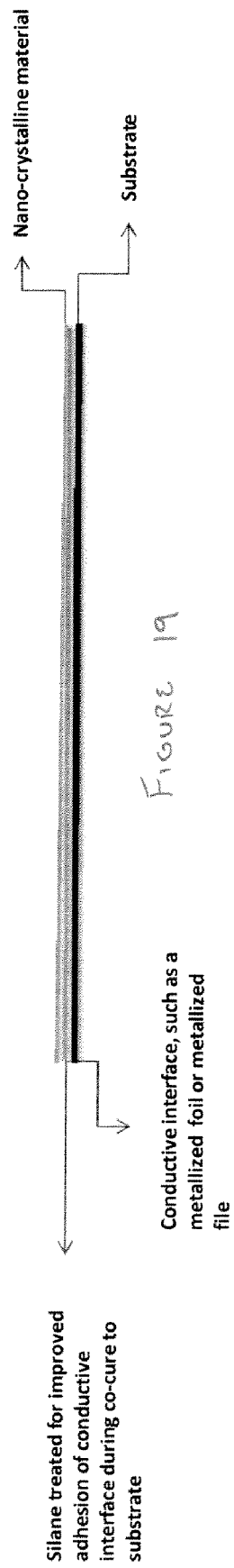

As described above, to facilitate adhesion of the nano-crystalline layer to the substrate, an adhesive conductive interface, also known as a conductive tie-layer, can be employed. With reference to FIGS. 16 and 17, the conductive tie-layer, such as a metalized foil or metalized film, is used during a co-cure process to increase adhesion of nano-crystalline material to a substrate of a portion of a bicycle frame and component. In the depicted embodiment, the conductive interface is a copper foil. The conductive interface can include a non-smooth surface on one side in order to obtain a high level of adhesion. To improve the adhesion of the conductive tie-layer to the substrate, an underside of the conductive tie-layer is at least partially coated with a silane. As shown, an organosilane treatment is be applied to the underside of the conductive tie layer. The organosilane treatment also improves the impact performance of the substrate. However, it should be appreciated by one skilled in the art that alternative silanes are contemplated. As shown in FIGS. 18 and 19, a coating of nano-crystalline material is applied to the conductive tie-layer.

FIGS. 20 and 21 illustrate a method of forming an electroformed portion of a bicycle frame and component. A three dimensional conductive preform of a substrate of the portion of the bicycle frame and component is provided. The conductive preform can be a metallized foil or metallized film, such as a copper foil or copper film. The conductive preform is then plated with the nano-crystalline material in a manner described above. In this case, the nano-crystalline material is electroformed onto the conductive preform. The electroplated preform is then adhered to the substrate such as by co-curing the electroplated preform onto the substrate. A silane, such as an organosilane adhesion promoter, can be applied to an underside of the electroplated preform for improved adhesion of the preform to the substrate.

An example of a copper foil for use as the conductive preform is the copper foil manufactured by Oak-Mitsui, a division of Mitsui Kinzoku Corporate Group. This copper foil is manufacture via an electro-deposit process. It is electro-formed on a rotating titanium drum. The electroformed foil is then surface treated contingent upon specific applications. During the treating process, copper dendrites are deposited onto the foil surface to enhance bonding to B-staged resins upon lamination. Specific silanes are applied to promote chemical adhesion. Thicknesses for the copper foil can range from 12 μm to 250 μm. The copper foil can be drawn to yield complex shapes.

Regarding other conductive foils, films or fabrics, there are several different methods of obtaining a conductive layer, such as vacuum metalizing of a polyester film; Chemical Vapor deposition (CVD) onto a film or fabric; and electro-deposition of copper, nickel, cobalt, etc., onto carbon fibers. When a metalized fabric is utilized, it can be part of the substrate structure since the given fabric will have a specific modulus and tensile strength. Therefore the metalized tie-layer is not parasitic to the substrate but synergistic. The film thicknesses can range from 5 μm to 400 μm.

Figure 22:
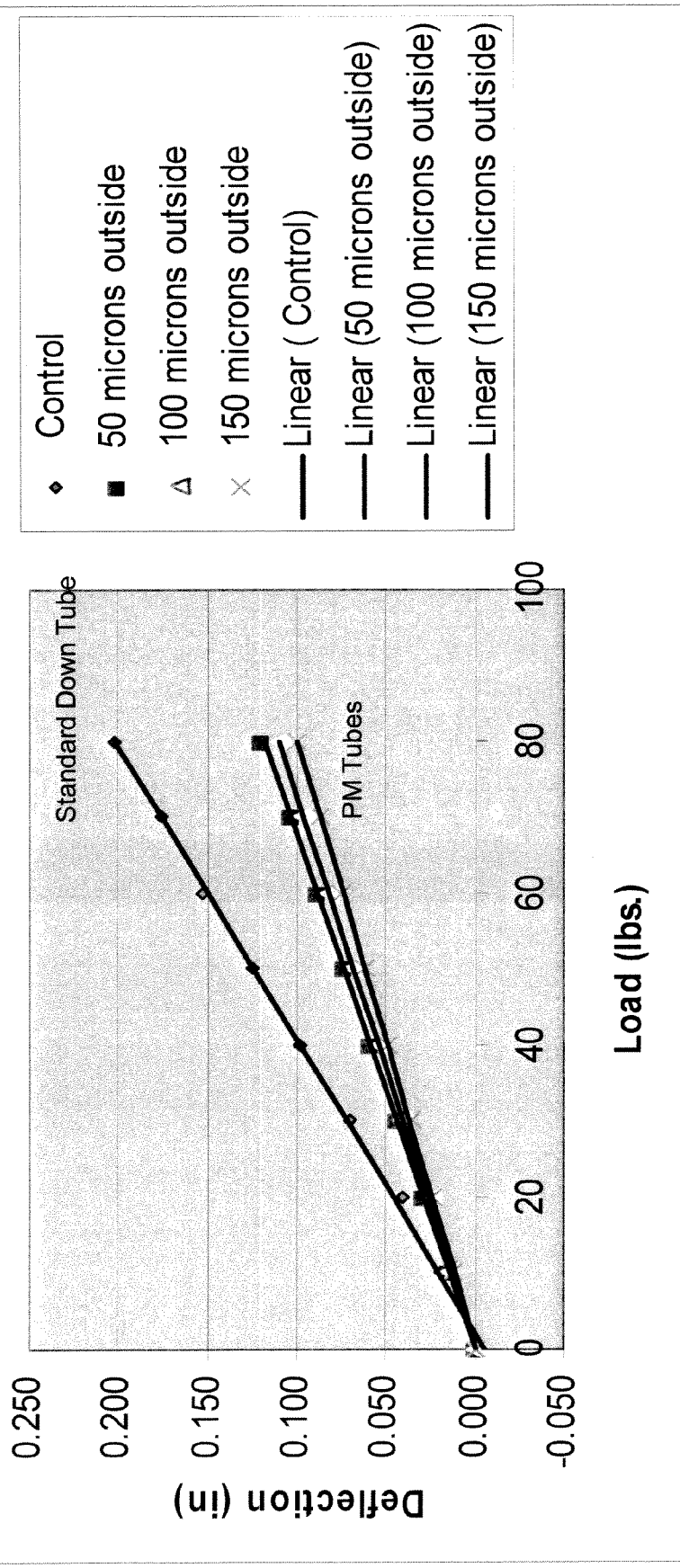
Figure 23:
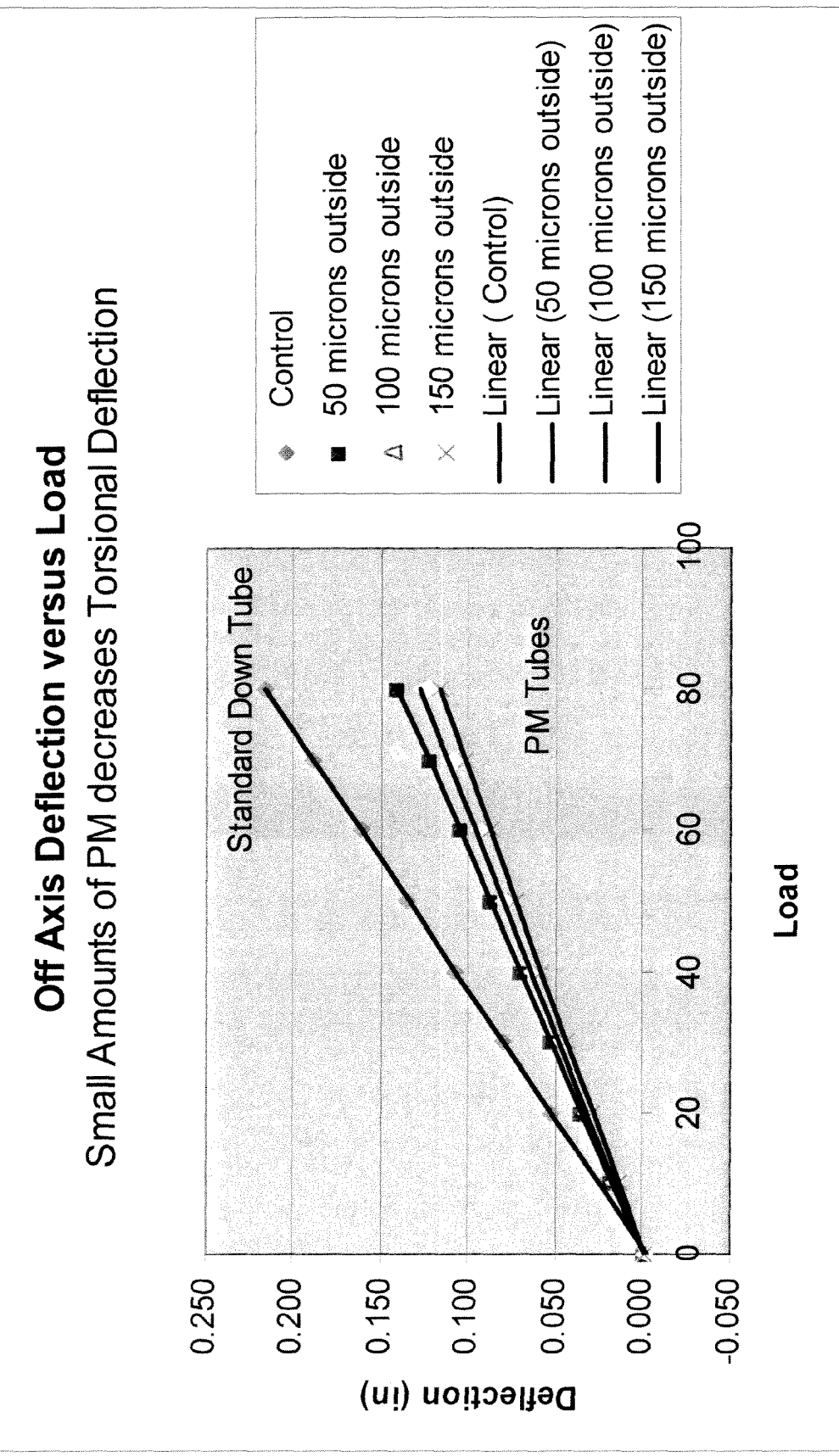
Figure 2A:
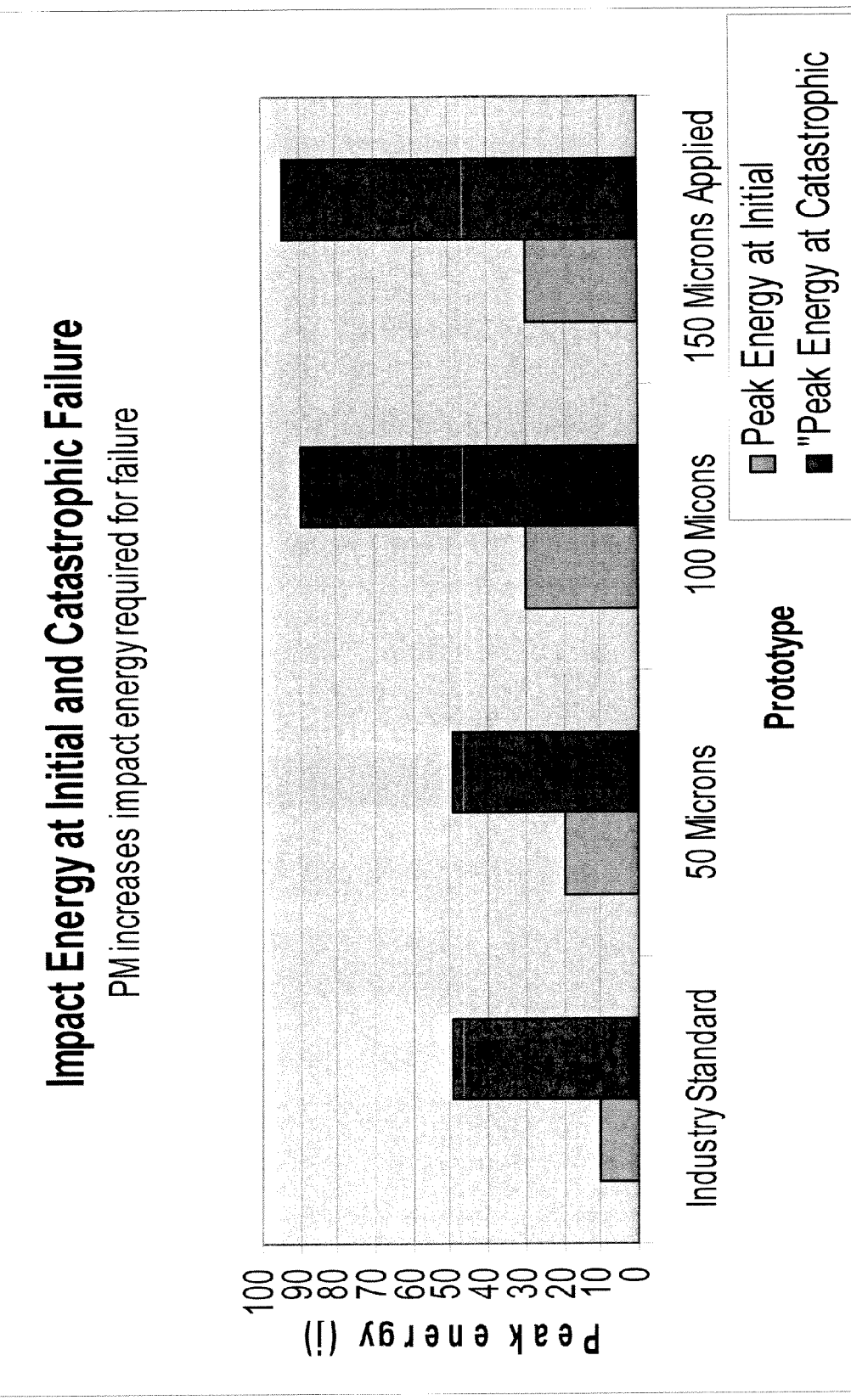
Figure 25:
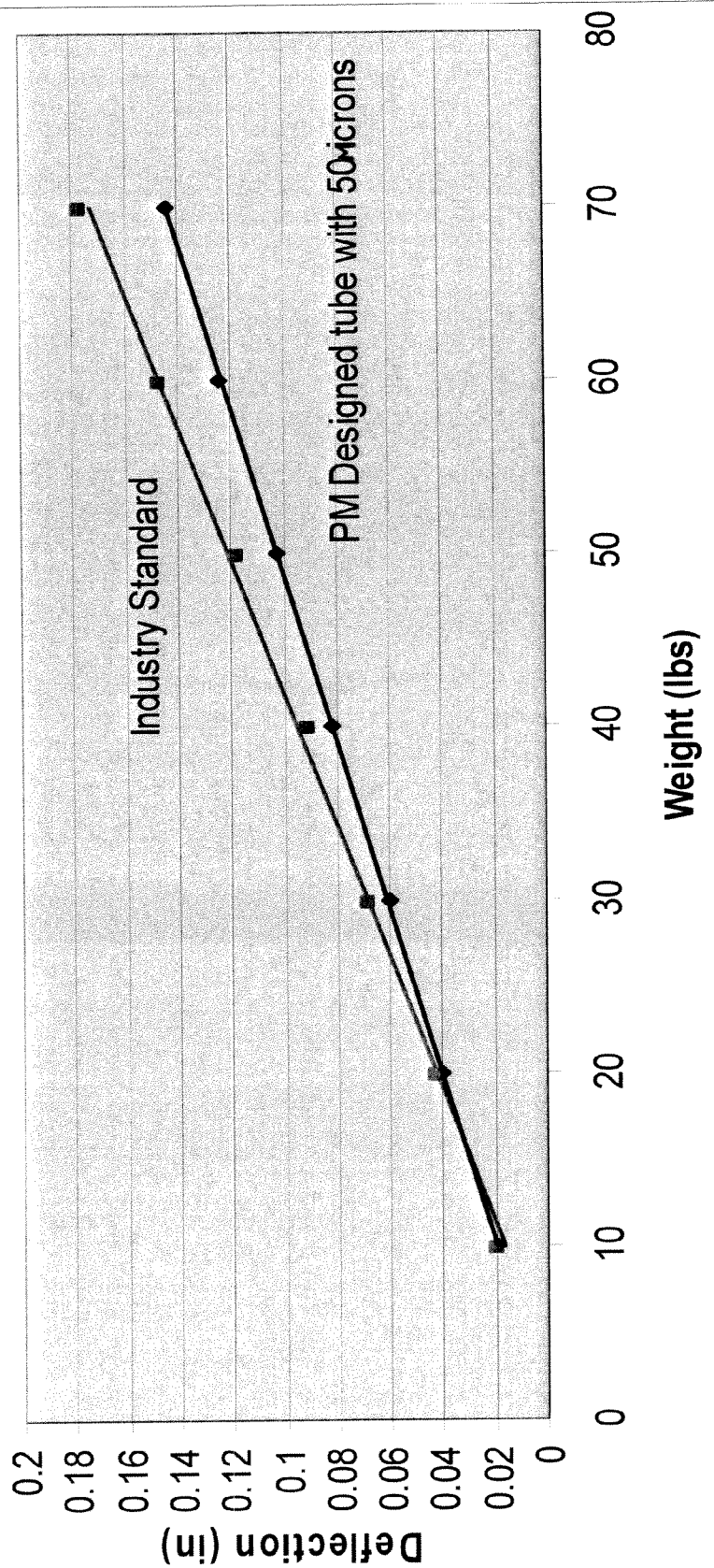
Figure 26:
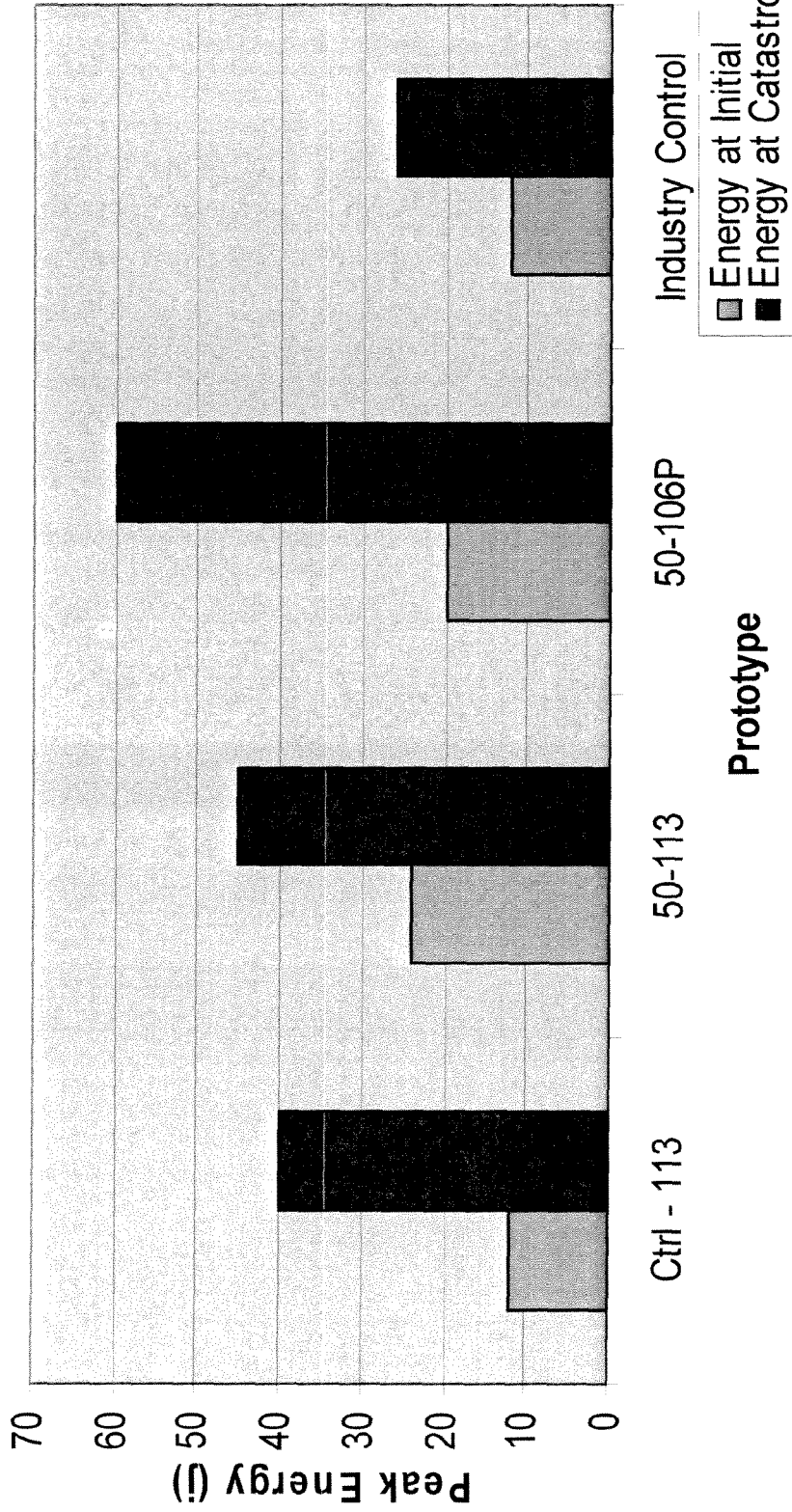

FIGS. 22-26 illustrate nano-crystalline bicycle frame and component design and analysis characteristics in accordance with the present disclosure. As shown in FIGS. 22 and 23, nano-crystalline coated down tubes have a smaller deflection compared to a conventional down tube. FIG. 24 illustrates peak energy comparisons of a conventional down tube and nano-crystalline coated down tubes. As shown in FIG. 25, a nano-crystalline coated down tube has a smaller deflection compared to a conventional down tube of an equivalent weight. FIG. 26 illustrates peak energy comparisons of a conventional down tube and a nano-crystalline coated down tube of equivalent weight.

A practitioner of ordinary skill in the art requires no additional explanation in developing the embodiments described herein but may nevertheless find some helpful guidance regarding characteristics and formation of nanostructured materials by examining the patent application of Palumbo et al., U.S. patent application Ser. No. 11/013,456, entitled "Strong, Lightweight Article Containing a Fine-Grained Metallic Layer" and filed on Dec. 17, 2004, and the patent application of Palumbo et al., U.S. patent application Ser. No. 10/516,300, entitled "Process for Electro-plating Metallic and Metal Matrix Composite Foils, Coatings and Microcomponents" and filed on Dec. 9, 2004, the disclosures of which are incorporated herein by reference in their entirety.

While the disclosure has been described with reference to the specific embodiments thereof, it should be understood by those skilled in the art that various changes may be made and equivalents may be substituted without departing from the true spirit and scope of the disclosure. In addition, many modifications may be made to adapt a particular situation, material, composition of matter, method, operation or operations, to the objective, spirit and scope of the disclosure. In particular, while certain methods may have been described with reference to particular operations performed in a particular order, it will be understood that these operations may be combined, sub-divided, or re-ordered to form an equivalent method without departing from the teachings of the disclosure. Accordingly, unless specifically indicated herein, the order and grouping of operations where processes involving one or more operations are described is not a limitation of the disclosure. Also that various presently unforeseen or unanticipated alternatives, modifications, variations or improvements therein may be subsequently made by those skilled in the art which are also intended to be encompassed by the following claims.

What is claimed is:

1. A bicycle comprising a frame, wherein a portion of the frame includes a substrate and a layer of nanostructured material with an average grain size between 2 nm and 5,000 nm extending over at least a portion of the substrate, wherein a conductive interface is disposed between the substrate and layer of nanostructured material for improved adhesion of the layer of nanostructured material to the substrate and improved impact performance of the frame portion, wherein the frame portion further includes a silane applied to the conductive interface to improve adhesion of the conductive interface to the substrate.

2. The bicycle of claim 1, wherein the layer of nanostructured material extends over at least a part of an inner surface of the substrate.

3. The bicycle of claim 1, wherein the layer of nanostructured material extends over at least a part of an outer surface of the substrate.

4. The bicycle of claim 1, wherein the layer of nanostructured material fully encapsulates the substrate.

5. The bicycle of claim 1, wherein the conductive interface is a metallized film or a metallized foil, the conductive interface being used during a co-cure process, the layer of nanostructurd material being applied to the conductive interface.

6. The bicycle of claim 5, wherein the conductive interface is a copper film.

7. The bicycle of claim 1, wherein the conductive interface includes a non-smooth surface on one side in order to obtain a high level of adhesion.

8. The bicycle of claim 1, wherein the silane is an organosilane.

9. The bicycle of claim 1, wherein the frame portion of the frame is one of a head tube lug, a seat tube lug and a bottom bracket lug.

10. The bicycle of claim 1, wherein the frame portion of the frame is one of a top tube, a down tube and seat tube.

11. The bicycle of claim 1, wherein the frame portion of the frame is one of a chain stay and a seat stay.

12. The bicycle of claim 1, further comprising a bicycle component mounted to the frame, wherein a portion of the bicycle component includes a substrate and a layer of nanostructured material extending over at least a portion of the substrate to improve wear, strength and impact resistance of the substrate, wherein a metallized tie-layer is disposed between the substrate and layer of nanostructured material for improved adhesion of the layer of nanostructured material to the substrate, wherein a silane is coated to an underside of the tie-layer to facilitate adhesion of the tie-layer to the substrate.

13. The bicycle of claim 12, wherein the bicycle component is one of a fork, a derailleur, a rim, a spoke, a brake, a sprocket, a pedal, a crank arm, a stem, a cable, a chain and a handle bar.

14. The bicycle of claim 1, wherein the substrate is selected from the group of steel, aluminum, magnesium, alloys, thermoplastic polymers, and thermoset polymers, including filled and composite polymers.

15. The bicycle of claim 1, wherein the substrate has a thickness ranging from 0.003 inch to 0.500 inch,
wherein the layer of nanostructured material has a thickness ranging from 0.0005 inch to 0.010 inch, a modulus of resilience ranging from 150 GPa and 250 GPa, a yield strength ranging from 600 MPa and 1100 GPa, a hardness ranging from 250 Vickers and 500 Vickers, an elastic strain limit ranging from 0.30% and 2.50%, and a weight between 5 percent and 40 percent of the total weight of the frame,
wherein the layer of nanostructured material has a microstructure with an average grain size between 5 nm and 150 nm,
wherein the layer of nanostructured material comprises at least about 2.5 percent by volume of the frame portion, and
wherein the portion of the frame containing the layer of nanostructured material has a torsional stiffness per unit weight improved by at least about 5% when compared to the torsional stiffness per unit weight of the frame portion not containing the metallic layer.

16. A bicycle comprising:
a frame, wherein a portion of the frame includes a substrate and a layer of nanostructured material having an average grain size in the range of about 2 nm to 5,000 nm extending over at least a portion of the substrate, wherein a conductive interface is disposed between the substrate and layer of nanostructured material for improved adhesion of the layer of nanostructured material to the substrate and improved impact performance of the frame portion; and
a bicycle component mounted to the frame, wherein a portion of the bicycle component includes a substrate and a layer of nanostructured material extending over at least a portion of the substrate to improve wear, strength and impact resistance of the substrate, wherein a metallized tie-layer is disposed between the substrate and layer of nanostructured material for improved adhesion of the layer of nanostructured material to the substrate, wherein a silane is coated to at least one of an underside of the tie-layer and an underside of the conductive interface to facilitate adhesion of the at least one of the tie-layer and the conductive interface to the substrate.

* * * * *